US010728561B2

(12) United States Patent
Matsunobu et al.

(10) Patent No.: US 10,728,561 B2
(45) Date of Patent: Jul. 28, 2020

(54) IMAGE ENCODING METHOD AND IMAGE ENCODING APPARATUS

(71) Applicant: Panasonic Intellectual Property Corporation of America, Torrance, CA (US)

(72) Inventors: Toru Matsunobu, Osaka (JP); Toshiyasu Sugio, Osaka (JP); Takahiro Nishi, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 701 days.

(21) Appl. No.: 14/941,580

(22) Filed: Nov. 14, 2015

(65) Prior Publication Data

US 2016/0073116 A1 Mar. 10, 2016

Related U.S. Application Data

(63) Continuation of application No. PCT/JP2015/002112, filed on Apr. 17, 2015.

(Continued)

(30) Foreign Application Priority Data

Jan. 23, 2015 (JP) ................................ 2015-011805

(51) Int. Cl.
*H04N 19/187* (2014.01)
*H04N 19/31* (2014.01)
(Continued)

(52) U.S. Cl.
CPC ......... *H04N 19/187* (2014.11); *H04N 19/109* (2014.11); *H04N 19/146* (2014.11);
(Continued)

(58) Field of Classification Search
USPC ..................................................... 375/240.01
See application file for complete search history.

(56) References Cited

U.S. PATENT DOCUMENTS

2003/0174771 A1* 9/2003 Sugahara ............... H04N 19/13
375/240.03
2010/0158134 A1* 6/2010 Yin ........................ H04N 19/30
375/240.26
(Continued)

OTHER PUBLICATIONS

International Search Report of PCT application No. PCT/JP2015/002112 dated Jun. 23, 2015.
Benjamin Bross et al., "High Efficiency Video Coding (HEVC) text specification draft 10 (for FDIS & Last Call)", JCTVC-L1003_v34, Jan. 14-23, 2013.
(Continued)

*Primary Examiner* — Christopher S Kelley
*Assistant Examiner* — Ana Picon-Feliciano
(74) *Attorney, Agent, or Firm* — Greenblum & Bernstein, P.L.C.

(57) ABSTRACT

An image encoding method includes acquiring a constant bit rate or a variable bit rate, determining temporal layers for a plurality of images, and setting, in a case where the constant bit rate is selected, (1) a first bit rate type of a top temporal layer to the constant bit rate, and (2) a second bit rate type of one or more other layers to the variable bit rate. The method also includes setting, in a case where the variable bit rate is selected, both the first bit rate type of the top temporal layer and the second bit rate of the one or more layers to the variable bit rate. The method further includes encoding each of the plurality of images, prohibiting reference to the images with the temporal layers higher than each of the temporal layers that each of the images belongs to, and generating the bitstream.

6 Claims, 26 Drawing Sheets

Related U.S. Application Data

(60) Provisional application No. 62/002,332, filed on May 23, 2014.

(51) Int. Cl.
 *H04N 19/146* (2014.01)
 *H04N 19/109* (2014.01)
 *H04N 19/184* (2014.01)
 *H04N 19/70* (2014.01)

(52) U.S. Cl.
 CPC .......... *H04N 19/184* (2014.11); *H04N 19/31* (2014.11); *H04N 19/70* (2014.11)

(56) References Cited

U.S. PATENT DOCUMENTS

| | | | |
|---|---|---|---|
| 2013/0089141 A1* | 4/2013 | Srinivasamurthy .. | H04N 19/172 375/240.03 |
| 2013/0170561 A1* | 7/2013 | Hannuksela ..... | H04N 21/23424 375/240.25 |
| 2014/0003535 A1* | 1/2014 | Haque ................... | H04N 19/70 375/240.25 |
| 2014/0341302 A1* | 11/2014 | Wang ................... | H04N 19/176 375/240.26 |

OTHER PUBLICATIONS

Sakae Okubo et al., "H.265/HEVC Textbook" Oct. 2, 2013, pp. 214-226 (Partial Translation).

* cited by examiner

*FIG. 5*

|  | BIT RATE TYPE | |
|---|---|---|
| EXTERNAL PARAMETER (INPUT VALUE) | CONSTANT | VARIABLE |
| Temporal Id = 2 (TOP LAYER) | CONSTANT | VARIABLE |
| Temporal Id = 1 (OTHER THAN TOP LAYER) | VARIABLE | VARIABLE |
| Temporal Id = 0 (OTHER THAN TOP LAYER) | VARIABLE | VARIABLE |

FIG. 16

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 27

| CONFORMING STANDARD | DRIVING FREQUENCY |
|---|---|
| MPEG4.AVC | 500MHz |
| MPEG2 | 350MHz |
| ⋮ | ⋮ |

IMAGE ENCODING METHOD AND IMAGE ENCODING APPARATUS

BACKGROUND

1. Technical Field

The present disclosure relates to an image encoding method and an image encoding apparatus.

2. Description of the Related Art

In conventional image encoding schemes represented by an ITU-T standard called H.26x and an ISO/IEC standard called MPEG-x, in order to operate an encoder and a decoder synchronously, a provision of conformance (conformance to standards) is defined as a framework to secure compatibility of the encoder and the decoder (refer to P.214 to P.226 of Non-Patent Literature 2).

Also, a concept of a Hypothetical Reference Decoder (HRD) that hypothetically models buffer management of the decoder is introduced. By using HRD, a failure of the decoder may be prevented, such as underflow, which is image data being not contained in the buffer with decoding timing, and overflow, which is image data coming in exceeding a prepared buffer size.

Specifically, a Hypothetical Stream Scheduler (HSS) manages input of a bitstream to a Coded Picture Buffer (CPB) of HRD. Input methods include two bit rate types, a constant bit rate and a variable bit rate.

In a case of the constant bit rate, the bitstream is always input into CPB of HRD at a fixed bit rate. In a case of encoding an image at the constant bit rate, it is necessary to check both underflow and overflow.

In a case of the variable bit rate, the bit rate at which the bitstream is input into CPB of HRD is variable. Accordingly, since input of the bitstream may be suspended if there is no empty space in a CPB capacity of HRD, overflow does not occur. Therefore, in a case of encoding at the variable bit rate, it is necessary to check only underflow.

CITATION LIST

Non-Patent Literatures

NPL 1: Joint Collaborative Team on Video Coding (JCT-VC) of ITU-T SG16 WP3 and ISO/IEC JTC1/SC29/WG11, 12th Meeting: Geneva, CH, 14-23 Jan. 2013, "High Efficiency Video Coding (HEVC) text specification draft 10 (for FDIS & Last Call)", http://phenix.int-evry.fr/jct/doc_end_user/documents/12_Geneva/wg11/JCTVC-L10 03-v34.zip NPL 2: Sakae Okubo, et al. "H.265/HEVC Kyokasho (Textbook)", Impress Japan, 2013

In such an image encoding method, it is desired to be able to reduce an amount of processing for generating the bitstream that satisfies conformance.

SUMMARY

One non-limiting and exemplary embodiment provides an image encoding method or image encoding apparatus capable of reducing the amount of processing for generating the bitstream that satisfies conformance.

In one general aspect, the techniques disclosed here feature an image encoding method according to one aspect of the present disclosure is an image encoding method for generating a bitstream having temporal scalability by encoding a plurality of images, the image encoding method including: selecting a first bit rate type from a constant bit rate and a variable bit rate; determining temporal layers of the plurality of respective images; setting, in a case where the constant bit rate is selected as the first bit rate type, (1) a second bit rate type of the bitstream including encoded data of the plurality of images that belong to all the temporal layers, to the constant bit rate, and (2) a third bit rate type of a sub-bitstream which is part of the bitstream and which includes encoded data of the images that belong to the temporal layers other than a top-layer temporal layer among the plurality of images, to the variable bit rate; encoding each of the plurality of images, prohibiting reference to the images with the temporal layers higher than each of the images to be processed; and generating the bitstream that includes temporal scalability information that indicates the temporal layers of the plurality of images, bit rate control information that indicates the second bit rate type and the third bit rate type, and the plurality of encoded images.

The present disclosure may provide the image encoding method or image encoding apparatus capable of reducing the amount of processing for generating the bitstream that satisfies conformance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 5 is a diagram for describing determination processing of a bit rate type according to the first exemplary embodiment;

FIG. 16 is a diagram illustrating a structure of multiplexed data;

FIG. 27 is a diagram illustrating an example of a lookup table in which a video data standard and a driving frequency are associated with each other;

DETAILED DESCRIPTION (Findings Underlying the Present Disclosure)

Image encoding methods, such as an image encoding standard H.265/HEVC (refer to Non-Patent Literature 1), have a function of temporal scalability. A temporal identifier called a TemporalId is inserted in a bitstream that has temporal scalability (refer to P.211 to P.212 of Non-Patent Literature 2). Accordingly, an image decoding apparatus becomes capable of outputting a decoded image at a plurality of temporal resolutions. For example, in a case where a transmission rate of a bitstream obtained by encoding a moving image of 60 fps (frames per second) is insufficient, an image encoding apparatus (transmitting apparatus) cuts out a sub-bitstream with a frame rate reduced to 30 fps or 15 fps from the bitstream and transmits the obtained sub-bitstream, thereby preventing dropping frames and degradation of image quality in an image decoding apparatus (receiving apparatus).

Figure 1:
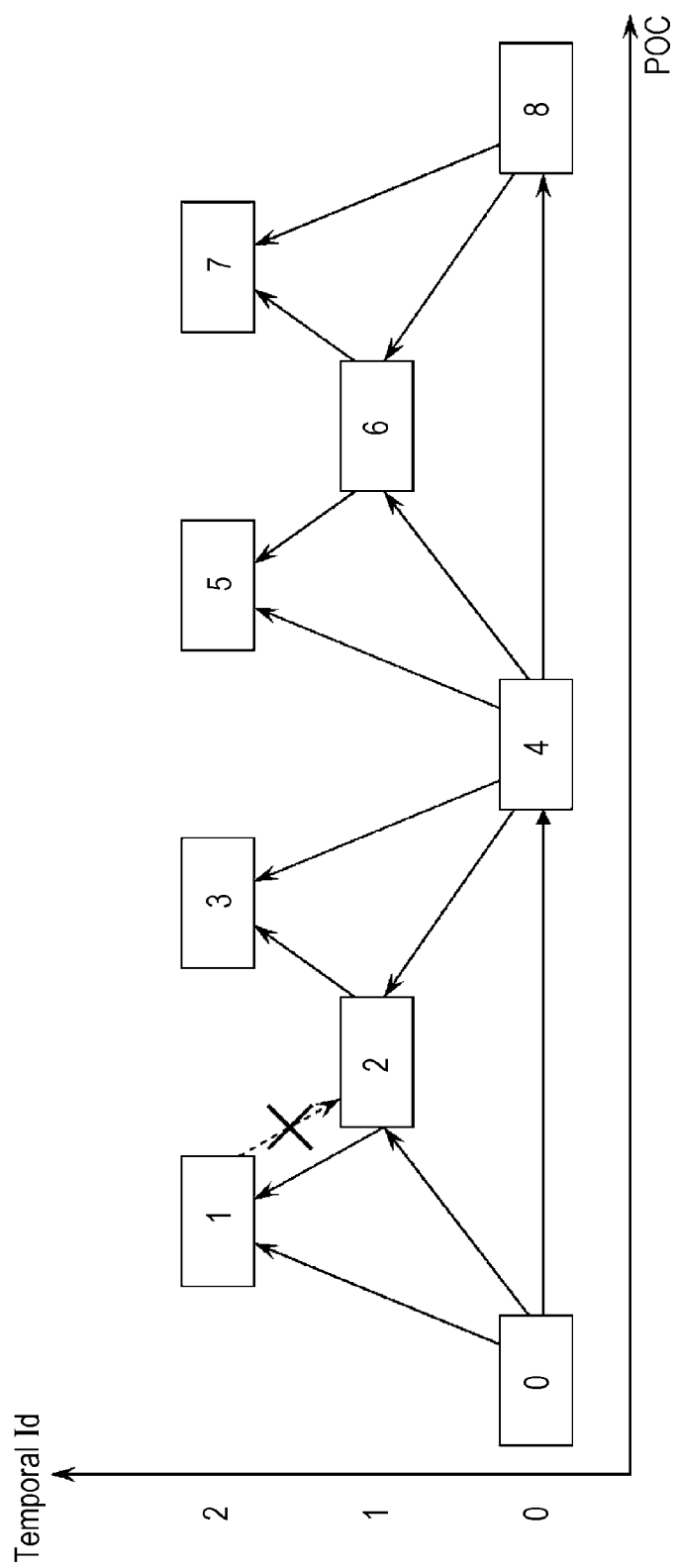
FIG. 1 is a diagram illustrating an example of a bitstream that has temporal scalability according to a first exemplary embodiment.

FIG. 1 is a diagram illustrating an example of the bitstream of 60 fps to which the TemporalId is imparted. A vertical axis represents the TemporalId and a horizontal axis represents a Picture Order Count (POC). In addition, it is possible to use a picture of an arrow source for generation of a prediction image of a picture of an arrow tip. For example, pictures of POC=0 and POC=4 may be used as reference images for a picture of POC=2.

The bitstream of this example is encoded on three layers with different TemporalIds. These layers are called sublayers or temporal layers. There is a restriction that, when temporal direction prediction of a current picture to be encoded or decoded is performed, a picture with a value of the TemporalId larger than a value of the TemporalID of the current picture may not be referred to. For example, since TemporalId=1 is imparted to the current picture in a case where a picture of POC=2 is the current picture, pictures of POC=1 and POC=3 to which TemporalId=3 is imparted may not be referred to.

By this restriction, when reducing the temporal resolution, the image encoding apparatus may remove a picture with large TemporalId easily from the bitstream. For example, when generating a sub-bitstream of 30 fps, the image encoding apparatus removes the sublayer of TemporalId=2 from the bitstream, and when generating a sub-bitstream of 15 fps, the image encoding apparatus removes the sublayers of TemporalId≥1 from the bitstream. Thus, since the frame rate may be converted without re-encoding, a load of the image encoding apparatus (transmitting apparatus) may be reduced.

However, there is a problem that, in a case of encoding the bitstream that satisfies conformance in all temporal resolutions by this method, an amount of processing increases and the load of the image encoding apparatus becomes large.

Specifically, in a case of generating a normal bitstream (having no temporal scalability), the image encoding apparatus only needs to perform encoding such that the bitstream may satisfy conformance. On the other hand, for a bitstream having temporal scalability, a sub-bitstream is generated by the above-described cutting out, and the sub-bitstream is transmitted to the image decoding apparatus. Therefore, in such a bitstream, not only an original bitstream including encoding information on all the sublayers, but also each sub-bitstream generated from the bitstream needs to satisfy conformance. Thus, it is difficult to encode a single bitstream such that all of the original bitstream and the plurality of sub-bitstreams may satisfy conformance, and in order to generate such a bitstream, processing in the image encoding apparatus is complicated and the amount of processing increases significantly.

Therefore, an image encoding method according to one aspect of the present disclosure is an image encoding method for generating a bitstream having temporal scalability by encoding a plurality of images, the image encoding method including: selecting a first bit rate type from a constant bit rate and a variable bit rate; determining temporal layers of the plurality of respective images; setting, in a case where the constant bit rate is selected as the first bit rate type, (1) a second bit rate type of the bitstream including encoded data of the plurality of images that belong to all the temporal layers, to the constant bit rate, and (2) a third bit rate type of a sub-bitstream which is part of the bitstream and which includes encoded data of the images that belong to the temporal layers other than a top-layer temporal layer among the plurality of images, to the variable bit rate; encoding each of the plurality of images, prohibiting reference to the images with the temporal layers higher than each of the images to be processed; and generating the bitstream that includes temporal scalability information that indicates the temporal layers of the plurality of images, bit rate control information that indicates the second bit rate type and the third bit rate type, and the plurality of encoded images.

Accordingly, even in a case where the bit rate type of the bitstream including the images of all the temporal layers is set to the constant bit rate, the bit rate type of the sub-bitstream is set to the variable bit rate. Accordingly, it is not necessary to take overflow of the sub-bitstream into consideration at a time of generation of the bitstream, and only control may be performed such that overflow of the bitstream including the images of all the temporal layers does not occur. Accordingly, the image encoding method may reduce the amount of processing of the image encoding apparatus at a time of encoding the bitstream that has the plurality of temporal resolutions and satisfies conformance in each of the temporal resolutions.

For example, in the encoding step, the plurality of images may be encoded such that an image decoding apparatus may perform processing on the bitstream in the second bit rate type without failure, by using a hypothetical reference decoder that hypothetically models buffer management of the image decoding apparatus.

For example, the temporal scalability information may include a temporal identifier that indicates the temporal layers to which the plurality of images respectively belong, or a pattern number that may be taken by temporal resolutions that specify one or more of the temporal layers to be decoded.

In addition, an image encoding apparatus according to one aspect of the present disclosure is an image encoding apparatus for generating a bitstream having temporal scalability by encoding a plurality of images, the image encoding apparatus including: a selector that selects a first bit rate type from a constant bit rate and a variable bit rate; a determination unit that determines temporal layers of the plurality of respective images; a setting unit that sets, in a case where the constant bit rate is selected as the first bit rate type, (1) a second bit rate type of the bitstream including encoded data of the plurality of images that belong to all the temporal layers, to the constant bit rate, and (2) a third bit rate type of a sub-bitstream which is part of the bitstream and which includes encoded data of the images that belong to the temporal layers other than a top-layer temporal layer among the plurality of images, to the variable bit rate; an encoder that encodes each of the plurality of images, prohibiting reference to the images with the temporal layers higher than each of the images to be processed; and a generation unit that generates the bitstream that includes temporal scalability information that indicates the temporal layers of the plurality of images, bit rate control information that indicates the second bit rate type and the third bit rate type, and the plurality of encoded images.

Note that these general or specific aspects may be implemented using a system, a method, an integrated circuit, a computer program, or a computer-readable recording medium such as a CD-ROM, or may be implemented using an arbitrary combination of a system, a method, an integrated circuit, a computer program, and a computer-readable recording medium.

Hereinafter, exemplary embodiments will be described in detail with reference to the drawings. Note that all the exemplary embodiments to be described below illustrate comprehensive or specific examples. Numerical values, shapes, materials, components, arrangement positions and connection forms of the components, steps, order of the steps, and the like indicated in the following exemplary embodiments are one example, and do not intend to limit the present disclosure. Also, among the components described in the following exemplary embodiments, components that are not described in an independent claim which represents the highest concept are described as optional components.

First Exemplary Embodiment

An image encoding apparatus according to the present exemplary embodiment sets a bit rate type of a sub-bitstream to a variable bit rate, regardless of a bit rate type of an original bitstream including encoding information on all sublayers. Accordingly, the image encoding apparatus may perform bit rate control, without taking overflow of the sub-bitstream into consideration. Therefore, an amount of processing of the image encoding apparatus may be reduced.

Figure 2:
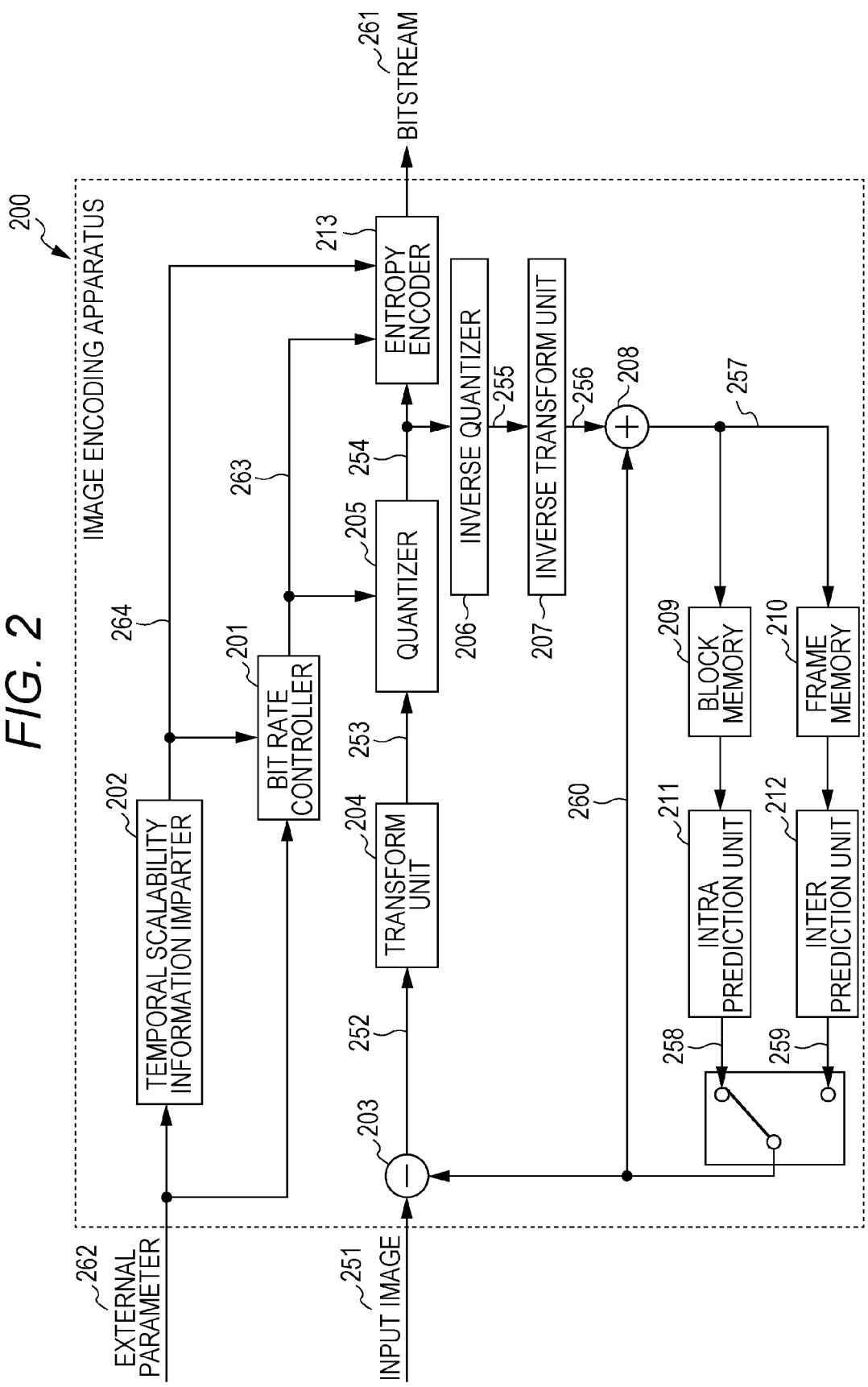
FIG. 2 is a block diagram illustrating structure of an image encoding apparatus according to the first exemplary embodiment.

First, a configuration of image encoding apparatus 200 according to the present exemplary embodiment will be described. FIG. 2 is a block diagram illustrating structure of image encoding apparatus 200 according to the present exemplary embodiment.

This image encoding apparatus 200 creates bitstream 261 that is an encoded bitstream by encoding, for each block, input image 251 that is an input video or image bitstream. This image encoding apparatus 200 includes, as illustrated in FIG. 2, bit rate controller 201, temporal scalability information imparter 202, subtracter 203, transform unit 204, quantizer 205, inverse quantizer 206, inverse transform unit 207, adder 208, block memory 209, frame memory 210, intra prediction unit 211, inter prediction unit 212, and entropy encoder 213.

In order to generate bitstream 261 that satisfies conformance, bit rate controller 201 controls quantizer 205 by using HRD. In addition, bit rate controller 201 outputs bit rate control information 263 to entropy encoder 213.

Bit rate control information 263 is information that indicates the bit rate types of the respective bitstreams of selectable temporal resolutions (60 fps, 30 fps, and 15 fps in an example illustrated in FIG. 1). Here, the bit rate type is a constant bit rate or a variable bit rate. For example, bit rate control information 263 is flag information cbr_flag[TemporalId].

cbr_flag[TemporalId] includes flags in a number identical to a number of the selectable temporal resolutions. Here, the TemporalId in cbr_flag[TemporalId] indicates a largest value out of the TemporalIds a picture to be played has. For example, in the example illustrated in FIG. 1, since the largest TemporalId among the TemporalIds the picture to be played has is "2" in a case where all the pictures of 60 fps are played, the bit rate type stored in cbr_flag[2] is used. Also, since the largest TemporalId among the TemporalIds the picture to be played has is "0" in a case of playing the picture in 15 fps, the bit rate type stored in cbr_flag[0] is used.

For example, cbr_flag[TemporalId]=1 represents the constant bit rate, and cbr_flag[TemporalId]=0 represents the variable bit rate.

Note that, in the following, the bitstream that has the highest temporal resolution (bitstream 261) is called a top-layer bitstream, and the bitstream with a low temporal resolution generated from bitstream 261 is called a low-layer bitstream or a sub-bitstream. Also, the bit rate type of the top-layer bitstream is called a top-layer bit rate type, and the bit rate type of the low-layer bitstream is called a low-layer bit rate type.

Temporal scalability information imparter 202 outputs temporal scalability information 264 to entropy encoder 213. Temporal scalability information 264 specifically represents the TemporalId of each image.

Input image 251 is input into subtracter 203 in units such as a plurality of pictures, one picture, or one slice. Subtracter 203 calculates residual signal 252 that is a difference between input image 251 and prediction image 260, and outputs residual signal 252 to transform unit 204.

Transform unit 204 transforms residual signal 252 into frequency coefficient 253, and outputs obtained frequency coefficient 253 to quantizer 205. Quantizer 205 quantizes frequency coefficient 253 that is input, and outputs obtained quantization coefficient 254 to inverse quantizer 206 and entropy encoder 213.

Note that processing of transform unit 204 and quantizer 205 may be executed sequentially on a TU-by-TU (Transform Unit) basis in each processing unit, and may be collectively executed by using multiplication of one or more matrices that have coefficients corresponding to a TU size.

Inverse quantizer 206 performs inverse quantization on quantization coefficient 254 that is output from quantizer 205, and outputs obtained frequency coefficient 255 to inverse transform unit 207. Inverse transform unit 207 transforms frequency coefficient 255 into residual signal 256 by performing inverse frequency transform on frequency coefficient 255, and outputs obtained residual signal 256 to adder 208.

Adder 208 adds residual signal 256 that is output from inverse transform unit 207 to prediction image 260 that is output from intra prediction unit 211 or inter prediction unit 212, and outputs obtained reconfigured image 257 to block memory 209 or frame memory 210 for further prediction.

Note that processing of inverse quantizer 206 and inverse transform unit 207 may be executed sequentially on a TU-by-TU basis, and may be collectively executed by using multiplication of one or more matrices that have coefficients corresponding to the TU size. Although terms "inverse quantization" and "inverse transform" are used here for clear description, "inverse quantization" and "inverse transform" may be called "quantization" and "transform", respectively, because "inverse quantization" and "inverse transform" are each processing using multiplication of the matrices only with differences in values of the coefficients from "quantization" and "transform".

Intra prediction unit 211 performs a search in reconfigured image 257 retained in block memory 209 for each prediction unit (PU), and creates prediction image 258 predicted to be similar to input image 251 by copying part of an image obtained by the search, or by performing multiplication for weighting.

Inter prediction unit 212 performs a search in reconfigured image 257 retained in frame memory 210 for each PU, and generates prediction image 259 by detecting one or more images that are most similar to or that have a high possibility of being similar to input image 251. In addition, one of prediction image 258 and prediction image 259 is selected as prediction image 260.

Entropy encoder 213 outputs bitstream 261 by encoding bit rate control information 263 from bit rate controller 201, temporal scalability information 264 from temporal scalability information imparter 202, quantization coefficient 254 from quantizer 205, the prediction information from intra prediction unit 211, and the prediction information from inter prediction unit 212.

Figure 3:
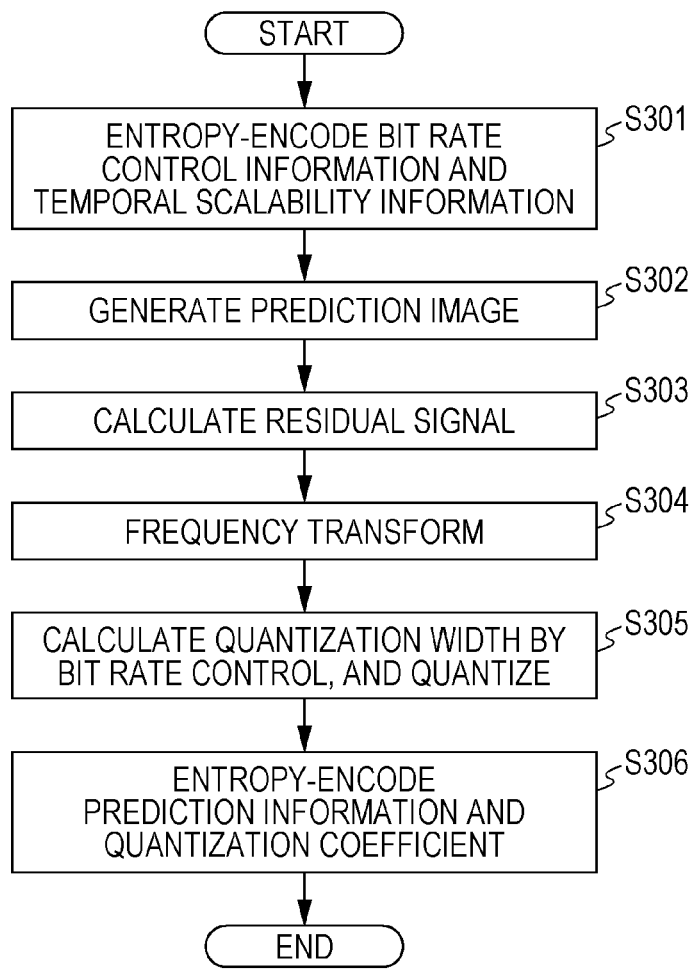
FIG. 3 is a flow chart of an encoding process according to the first exemplary embodiment.

Next, image encoding processing according to the present exemplary embodiment will be described. FIG. 3 is a flow chart of an image encoding process according to the present exemplary embodiment.

In step S301, image encoding apparatus 200 generates bit rate control information 263 and temporal scalability information 264. Image encoding apparatus 200 entropy-encodes generated bit rate control information 263 and temporal scalability information 264, and inserts encoded bit rate control information 263 and temporal scalability information 264 into a header of bitstream 261.

In step S302, image encoding apparatus 200 creates prediction image 260 by performing intra prediction or inter prediction.

In step S303, image encoding apparatus 200 calculates residual signal 252 that is a difference between prediction image 260 and input image 251.

In step S304, image encoding apparatus 200 calculates frequency coefficient 253 by performing frequency transform on residual signal 252.

In step S305, image encoding apparatus 200 calculates quantization width by bit rate control, and calculates quantization coefficient 254 by quantizing frequency coefficient 253 by using the obtained quantization width. Specifically, image encoding apparatus 200 calculates the quantization width by performing bit rate control that uses HRD in the top-layer bit rate type.

In step S306, image encoding apparatus 200 entropy-encodes the prediction information and quantization coefficient 254, and inserts the encoded prediction information and quantization coefficient 254 into bitstream 261.

Processing of step S301 will be described in detail below with reference to FIG. 4 to FIG. 9.

Figure 4:
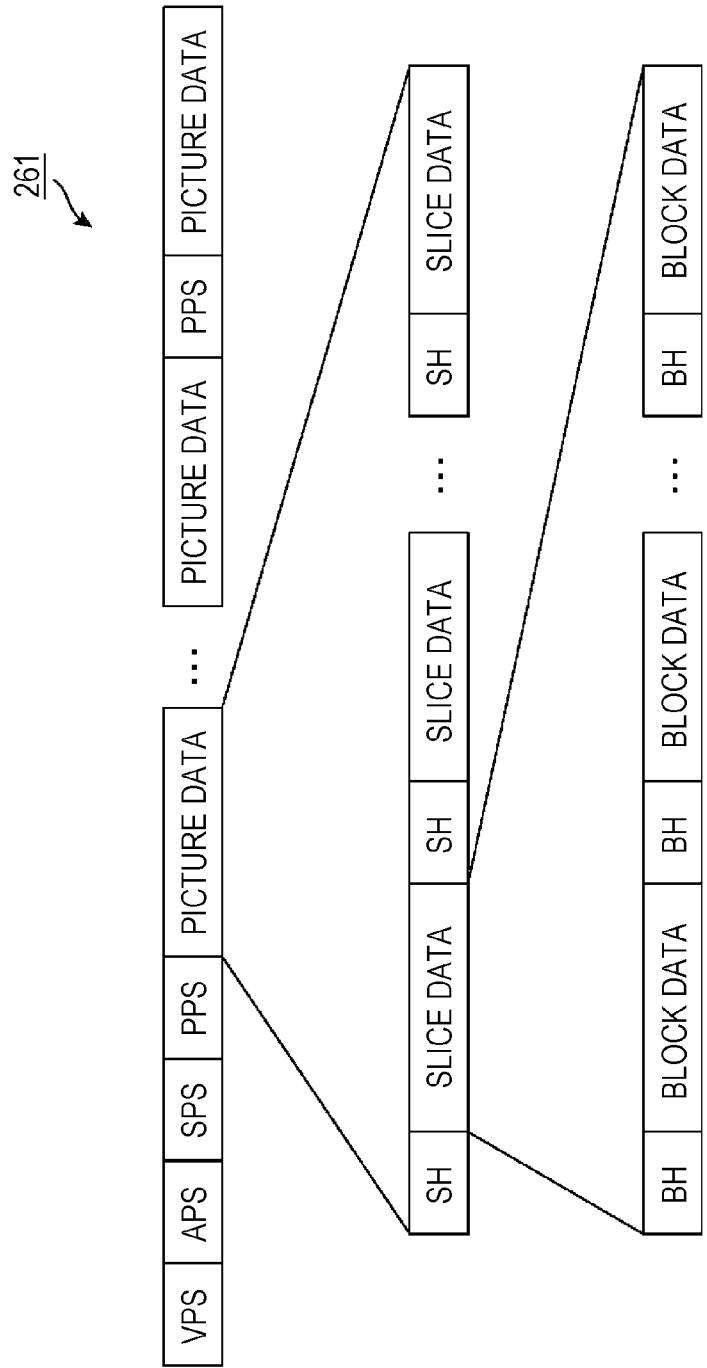
FIG. 4 is a diagram illustrating an example of data structure of the bitstream according to the first exemplary embodiment.

FIG. 4 is a diagram illustrating an example of data structure of bitstream 261 generated by image encoding apparatus 200. Bitstream 261 contains a header section, such as VPS (Video Parameter Set), APS (Adaptation Parameter Set), SPS (Sequence Parameter Set), and PPS (Picture Parameter Set), and picture data that is encoded image data. The picture data contains a slice header (SH) and slice data. The slice data contains encoded image data contained in a slice. The slice data contains a block header (BH) and block data. The block data contains encoded image data contained in the block.

Bit rate control information 263 and temporal scalability information 264 are encoded in entropy encoder 213, and are inserted into either one of VPS, APS, SPS, PPS, and SH.

FIG. 5 is a diagram for describing a calculation process of bit rate control information 263 by bit rate controller 201. Bit rate controller 201 determines the bit rate type of each layer in accordance with the bit rate type specified by external parameter 262.

Specifically, in a case where the constant bit rate is specified by external parameter 262, bit rate controller 201 sets the top-layer bit rate type (in this example, TemporalId=2) to the constant bit rate, and sets the bit rate type of layers other than the top layer (in this example, TemporalId=0 and TemporalId=1) to the variable bit rate. Also, in a case where the variable bit rate is specified by external parameter 262, bit rate controller 201 sets the bit rate type of all the layers (in this example, TemporalId=0 to 2) to the variable bit rate.

That is, bit rate controller 201 sets the top-layer bit rate type to be identical to the bit rate type specified by external parameter 262. In addition, bit rate controller 201 always sets all the bit rate types of the layers other than the top layer to the variable bit rate, without depending on the bit rate type specified by external parameter 262.

Figure 6:
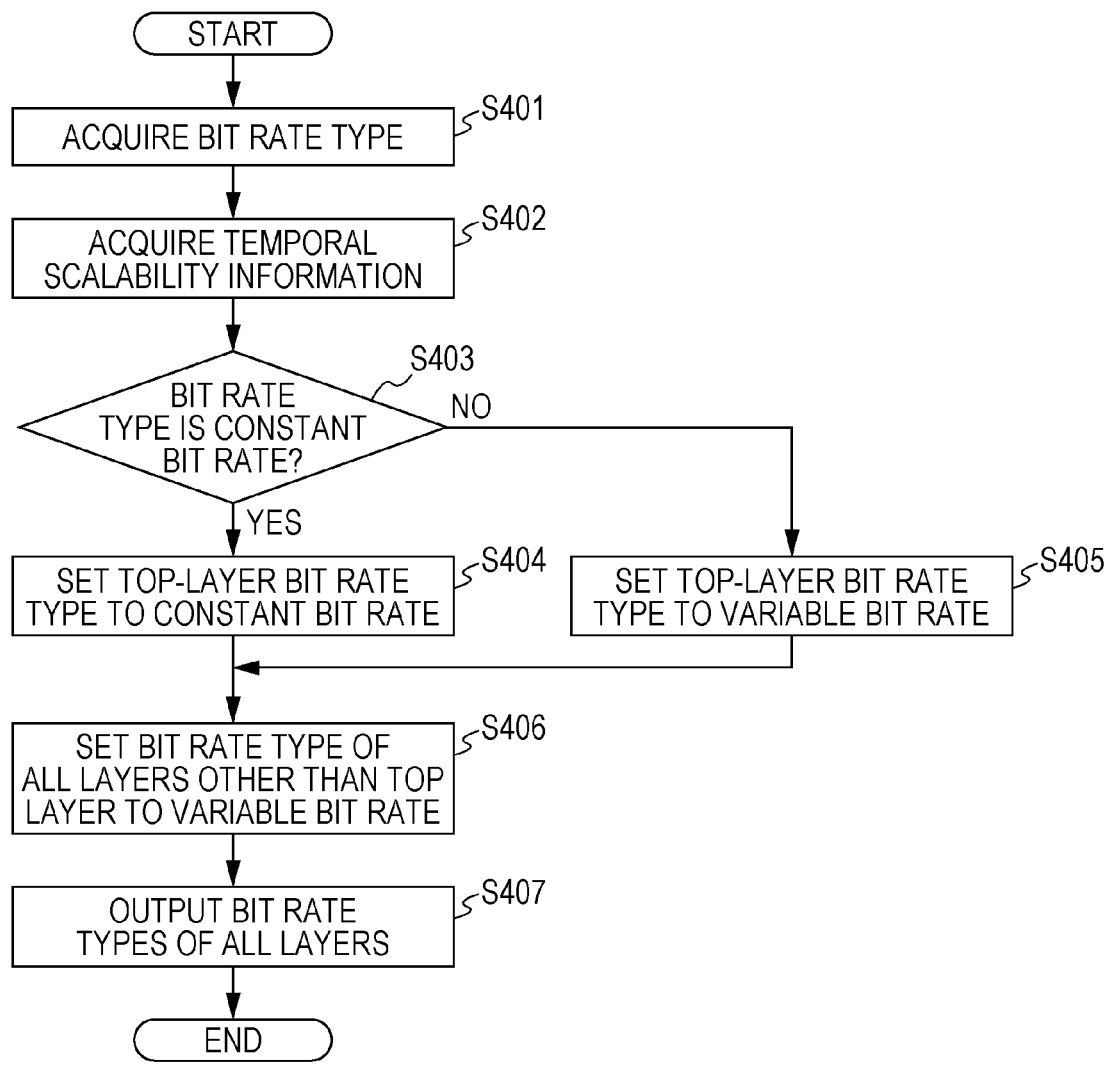
FIG. 6 is a flow chart of a calculation process of calculating bit rate control information and temporal scalability information according to the first exemplary embodiment.

FIG. 6 is a flow chart of a calculation process of bit rate control information 263.

In step S401, bit rate controller 201 acquires the bit rate type indicated by external parameter 262 in the temporal resolutions in which all the pictures are encoded.

In step S402, temporal scalability information imparter 202 acquires temporal scalability information indicated by external parameter 262. Here, the temporal scalability information indicates a number of sublayers, that is, a number of TemporalIds, or the TemporalId to be set for each picture. Note that information on these TemporalIds may be information on the TemporalId set for each picture in GOP unit, and may be information on the TemporalID for each slice type. Also, temporal scalability information imparter 202 generates temporal scalability information 264 based on the temporal scalability information indicated by external parameter 262, and outputs generated temporal scalability information 264 to bit rate controller 201. Here, temporal scalability information 264 indicates, for example, the number of sublayers, that is, the number of TemporalIds.

In step S403, bit rate controller 201 determines whether the bit rate type acquired in step S401 is the constant bit rate.

In a case where the bit rate type is the constant bit rate (Yes in S403), bit rate controller 201 sets the top-layer bit rate type to the constant bit rate in step S404. Specifically, bit rate controller 201 sets cbr_flag[2] of TemporalId=2 to "1" (constant bit rate).

On the other hand, in a case where the bit rate type is not the constant bit rate, that is, where the bit rate type is the variable bit rate (No in S403), bit rate controller 201 sets the top-layer bit rate type to the variable bit rate in step S405. Specifically, bit rate controller 201 sets cbr_flag[2] of TemporalId=2 to "0" (variable bit rate).

After step S404 or S405, bit rate controller 201 sets the bit rate type of all the layers other than the top layer to the variable bit rate in step S406. Specifically, bit rate controller 201 sets cbr_flag[TemporalId] of TemporalId≤1 to "0" (variable bit rate).

In step S407, bit rate controller 201 outputs cbr_flag [TemporalId], which is bit rate control information 263 indicating the bit rate types of respective layers, to entropy encoder 213.

Note that, although the bit rate type and temporal scalability information are input from outside as external parameter 262 in steps S401 and S402, a fixed value previously retained in image encoding apparatus 200 may be used as at least one of the bit rate type and the temporal scalability information.

The following describes that bitstream 261 that satisfies conformance in all the temporal resolutions may be created according to the present exemplary embodiment.

Figure 7:
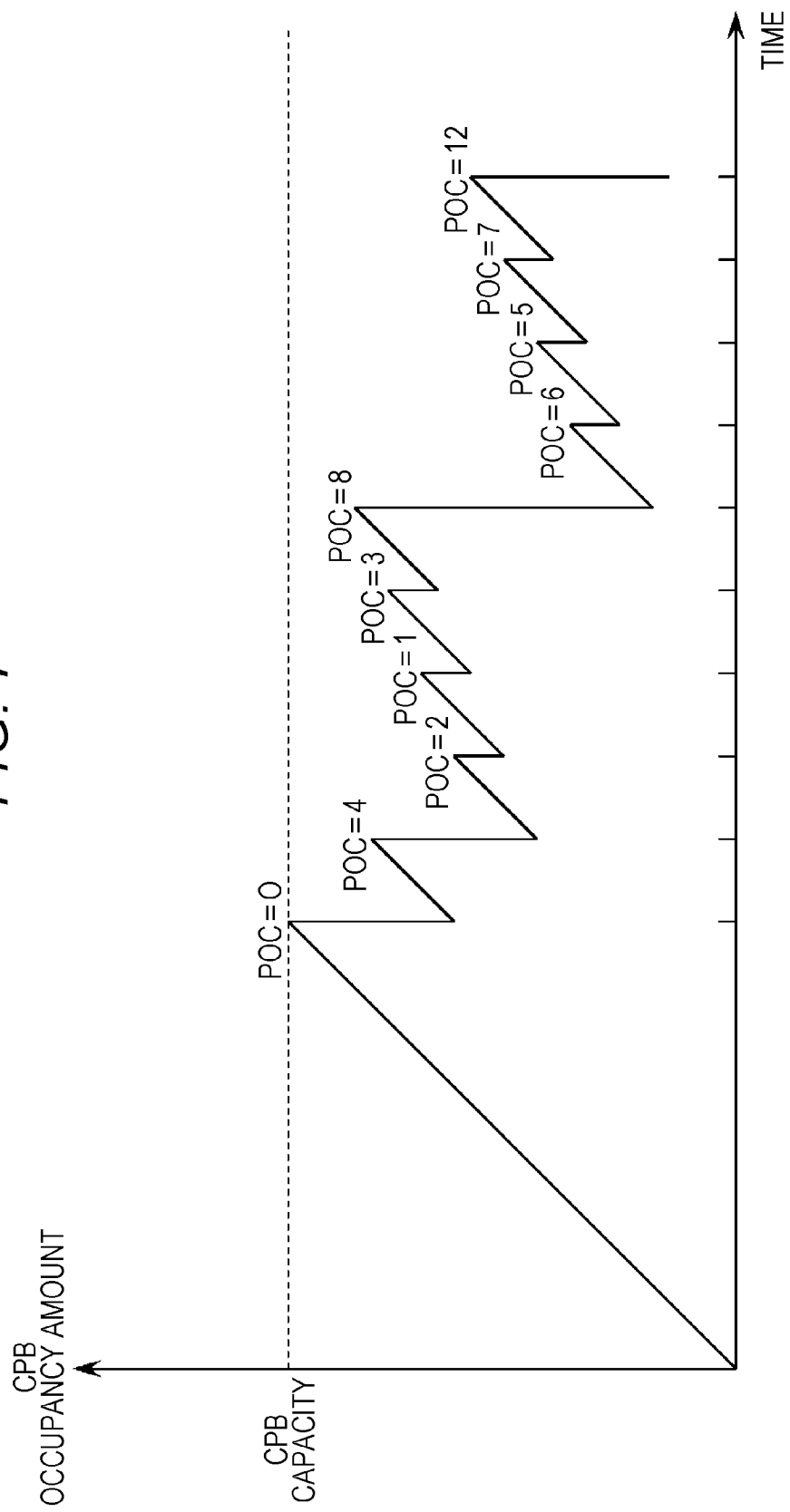
FIG. 7 is a diagram illustrating CPB of HRD at a time of encoding at a constant bit rate so as to satisfy conformance according to the first exemplary embodiment.

FIG. 7 is a diagram illustrating an example of a CPB occupancy amount of HRD with respect to the bitstream when a video of 60 fps is encoded satisfying conformance at the constant bit rate. A vertical axis of FIG. 7 represents the CPB occupancy amount, and a horizontal axis represents time. In addition, a horizontal line represents CPB capacity of HRD. As illustrated in FIG. 7, encoding is performed without causing overflow in encoding at 60 fps.

Figure 8:
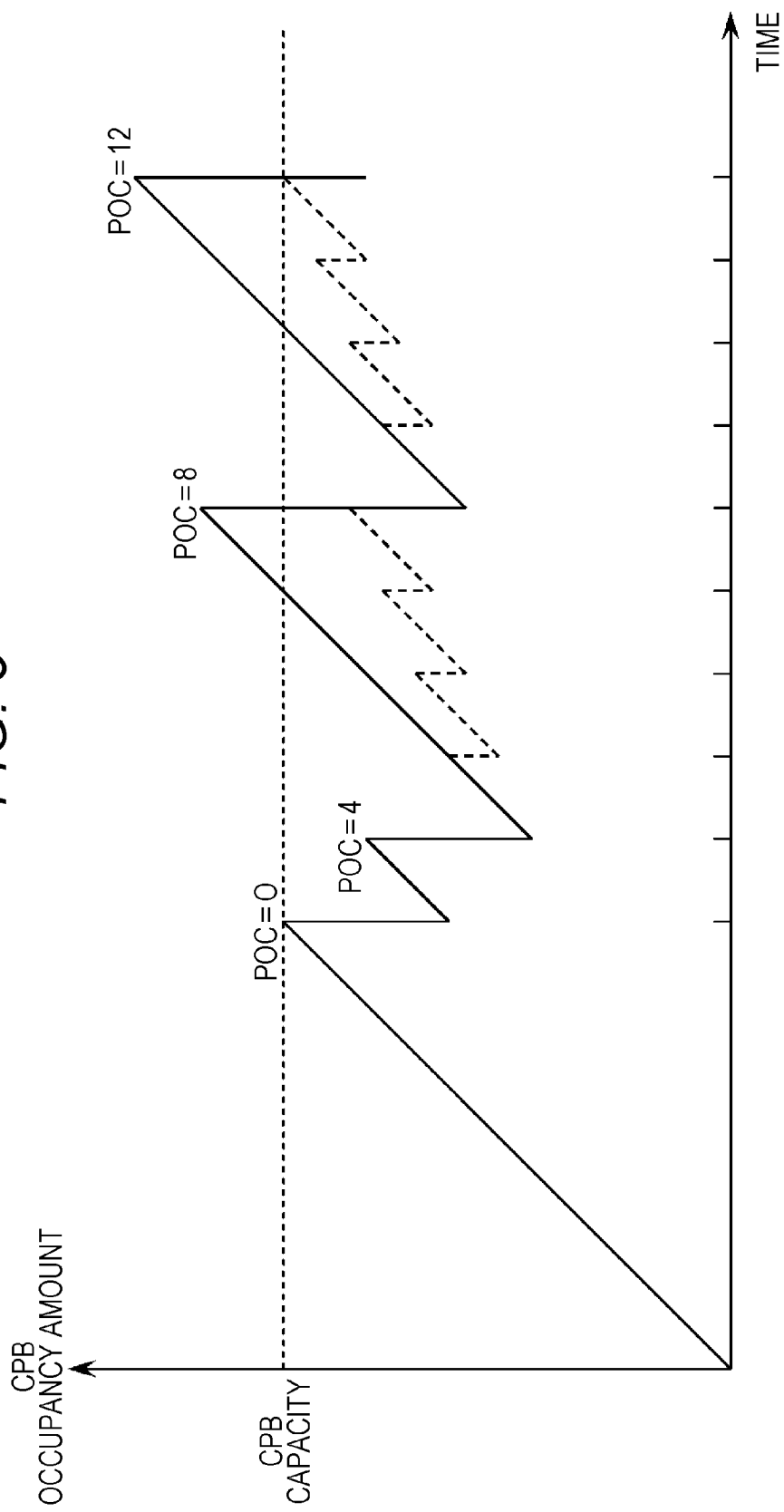
FIG. 8 is a diagram illustrating CPB of HRD when a temporal resolution is set to one fourth with the constant bit rate unchanged according to the first exemplary embodiment.

Note that, for description, the example of hierarchical structure of the bitstream illustrated in FIG. 1 is used. Here, the bitstream of 15 fps may be created from the bitstream of 60 fps by removing the picture of TemporalId≥1 from all the pictures. FIG. 8 illustrates the CPB occupancy amount of HRD at this time. Also, FIG. 8 is a diagram for comparison, and illustrates a case where cbr_flag[0]=1, that is, where the bit rate type in 15 fps is the constant bit rate. In this case, overflow occurs as illustrated in FIG. 8.

Figure 9:
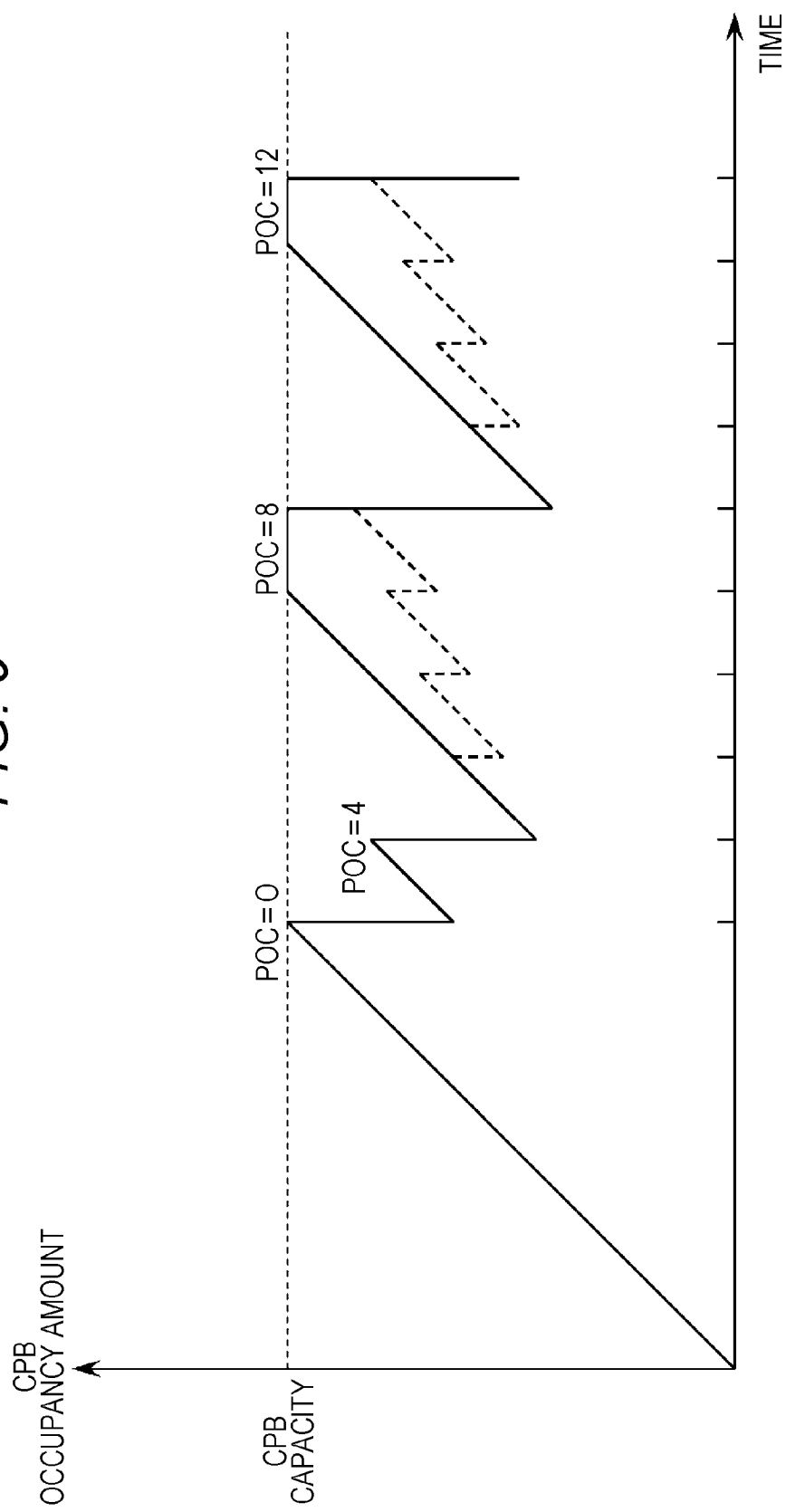
FIG. 9 is a diagram illustrating CPB of HRD when a variable bit rate is selected and the temporal resolution is set to one fourth according to the first exemplary embodiment.

On the other hand, in the present exemplary embodiment, as described above, settings of cbr_flag[TemporalId]=0 (TemporalId≤1) are made for low-layer bitstreams other than 60 fps. That is, the bit rate types other than 60 fps are set to the variable bit rate. In the variable bit rate, in a case where there is no empty space in the CPB capacity, input of the bitstream may be suspended. This may avoid overflow. FIG. 9 is a diagram illustrating the CPB occupancy amount of HRD in a case where the bit rate type of 15 fps is the variable bit rate. As illustrated in FIG. 9, occurrence of overflow may be prevented by setting the bit rate type to the variable bit rate.

In addition, an identical target bit rate may be set to the bitstreams of different temporal resolutions (above-described 60 fps, 30 fps, and 15 fps). In this case, an input amount to CPB per time in the plurality of bitstreams of different temporal resolutions is constant. In addition, in a case where the temporal resolution is changed from 60 fps to 15 fps, a buffer amount to be extracted from CPB decreases. Therefore, if encoding is performed such that underflow may not occur in the highest temporal resolution, underflow occurs in no temporal resolution.

Here, information that indicates extraction time from CPB is encoded, for example, into sequentially set Supplemental Enhance Information (SEI).

According to the present exemplary embodiment, the bitstream that satisfies conformance in all the temporal resolutions set by the TemporalId may be encoded, by controlling the bit rate such that underflow and overflow do not occur only in the highest temporal resolution in which all the pictures are encoded.

Thus, according to the configuration of the present exemplary embodiment, images may be appropriately encoded so as to satisfy conformance regardless of the transmission rate while increase in the amount of processing is inhibited.

As described above, image encoding apparatus 200 according to the present exemplary embodiment generates bitstream 261 that has temporal scalability by encoding the plurality of images.

Image encoding apparatus 200 selects a first bit rate type from the constant bit rate and the variable bit rate (S401), and determines the temporal layers of the plurality of respective images (S402). For example, image encoding apparatus 200 selects the bit rate type indicated by external parameter 262, or the previously prescribed bit rate type. In addition, image encoding apparatus 200 determines the temporal layers of the plurality of respective images based on the temporal scalability information indicated by external parameter 262.

In a case where the constant bit rate is selected as the first bit rate type (Yes in S403), image encoding apparatus 200 sets (1) a second bit rate type of bitstream 261 including encoded data of the plurality of images that belong to all the temporal layers, to the constant bit rate (S404), and (2) a third bit rate type of the sub-bitstream which is part of bitstream 261 and includes the encoded data of the image that belongs to temporal layers other than the top-layer temporal layer among the above-described plurality of images, to the variable bit rate (S406).

Next, image encoding apparatus 200 encodes each of the plurality of images, prohibiting reference to an image of a temporal layer higher than the temporal layer of the image to be processed (S302 to S305).

For example, by using the Hypothetical Reference Decoder (HRD) that hypothetically models buffer management of the image decoding apparatus, image encoding apparatus 200 encodes the plurality of images such that the image decoding apparatus may perform processing on bitstream 261 in the second bit rate type without failure. Specifically, image encoding apparatus 200 controls the quantization width by bit rate control using HRD such that underflow and overflow do not occur in the image decoding apparatus.

Also, in encoding of the plurality of images that belong to all the temporal layers, image encoding apparatus 200 determines the quantization width by performing bit rate control in the second bit rate type, and does not perform bit rate control in the third bit rate type on each of the sub-bitstreams of the low temporal resolution.

Next, image encoding apparatus 200 generates bitstream 261 including temporal scalability information 264 that indicates the temporal layers of the plurality of images, bit rate control information 263 that indicates the second bit rate type and the third bit rate type, and the plurality of encoded images (S301 and S306). Here, temporal scalability information 264 includes the temporal identifier (TemporalId) that indicates the temporal layer to which each of the plurality of images belongs, or a pattern number that may be taken by the temporal resolution that specifies one or more temporal layers to be decoded.

Thus, image encoding apparatus 200 according to the present exemplary embodiment sets the bit rate type of the sub-bitstream to the variable bit rate, regardless of the bit rate type of the top-layer bitstream including the encoding information on all the sublayers. Accordingly, image encoding apparatus 200 may perform bit rate control, without taking overflow of the sub-bitstream into consideration. Therefore, the amount of processing of image encoding apparatus 200 may be reduced.

In addition, as described above, the target bit rates of the top-layer bitstream and the sub-bitstream may be set identically. This eliminates a need for taking underflow of the sub-bitstream into consideration.

Accordingly, since image encoding apparatus 200 does not need to take into consideration overflow and underflow of the sub-bitstream, image encoding apparatus 200 needs to perform bit rate control only on the top-layer bitstream. Therefore, image encoding apparatus 200 may generate the bitstream that has temporal scalability and satisfies conformance by processing similar to processing of the normal bitstream (not having temporal scalability).

While the image encoding method and the image encoding apparatus according to the exemplary embodiment have been described above, the present disclosure is not limited to this exemplary embodiment.

For example, the present disclosure may be implemented as an image decoding method or an image decoding apparatus that decodes the bitstream generated by the above-described image encoding method or image encoding apparatus according to the exemplary embodiment.

Also, respective processing units included in the above-described image encoding apparatus according to the exemplary embodiment are typically implemented as an LSI, an integrated circuit. These processing units may be individually integrated into one chip, and may be integrated into one chip so as to contain part or all of the processing units.

Also, circuit integration is not limited to LSI, and may be implemented using dedicated circuitry or a general-purpose processor. An FPGA (Field Programmable Gate Array) that is programmable after manufacture of an LSI or a reconfigurable processor in which connections and settings of circuit cells within the LSI are reconfigurable may be used.

In each of the above-described exemplary embodiments, each component may be implemented with dedicated hardware or by executing a software program suitable for each component. Each component may be implemented by a program execution unit such as a CPU or a processor loading and executing a software program recorded in a recording medium, such as a hard disk or a semiconductor memory.

To put it in another way, the image encoding apparatus includes processing circuitry and a storage electrically connected to the processing circuitry (accessible from the processing circuitry). The processing circuitry includes at least one of the dedicated hardware and the program execution unit. Also, in a case where the processing circuitry includes the program execution unit, the storage stores the software program to be executed by the program execution unit. The processing circuitry executes the above-described image encoding method according to the exemplary embodiment by using the storage.

Furthermore, the present disclosure may be the above-described software program, and may be a non-transitory computer-readable recording medium that stores the above-described program. Obviously, the above-described program may be distributed via a transmission medium such as the Internet.

Also, all numerical values used above are merely illustrative ones used to describe the present disclosure specifically, and thus the present disclosure is not limited to illustrative numerical values.

Also, order in which steps included in the above-described image encoding method are executed is merely an illustrative one used to describe the present disclosure specifically, and thus the steps may be executed in order other than the above order. Also, some of the above steps may be executed simultaneously (in parallel) with another step.

While the image encoding method and the image encoding apparatus according to one or a plurality of aspects of the present disclosure have been described above on the basis of the exemplary embodiment, the present disclosure is not limited to this exemplary embodiment. The present exemplary embodiment to which various modifications conceivable by a person skilled in the art are made and exemplary embodiments that are made by combining elements of different exemplary embodiments may also be within the scope of the one or the plurality of exemplary embodiments of the present disclosure, as long as such exemplary embodiments do not depart from the gist of the present disclosure.

Second Exemplary Embodiment

The processes described in the first exemplary embodiment above can be implemented easily in a standalone computer system by recording a program for implementing the configuration of a video encoding method (image encoding method) or video decoding method (image decoding method) described in the exemplary embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video encoding method (image encoding method) or the video decoding method (image decoding method) described in the exemplary embodiment and systems using them will be further described. The systems include an image encoding/decoding apparatus which includes an image encoding apparatus that employs the image encoding method and an image decoding apparatus that employs the image decoding method. Other configurations of the systems can be changed as appropriate in accordance with the circumstances.

Figure 10:
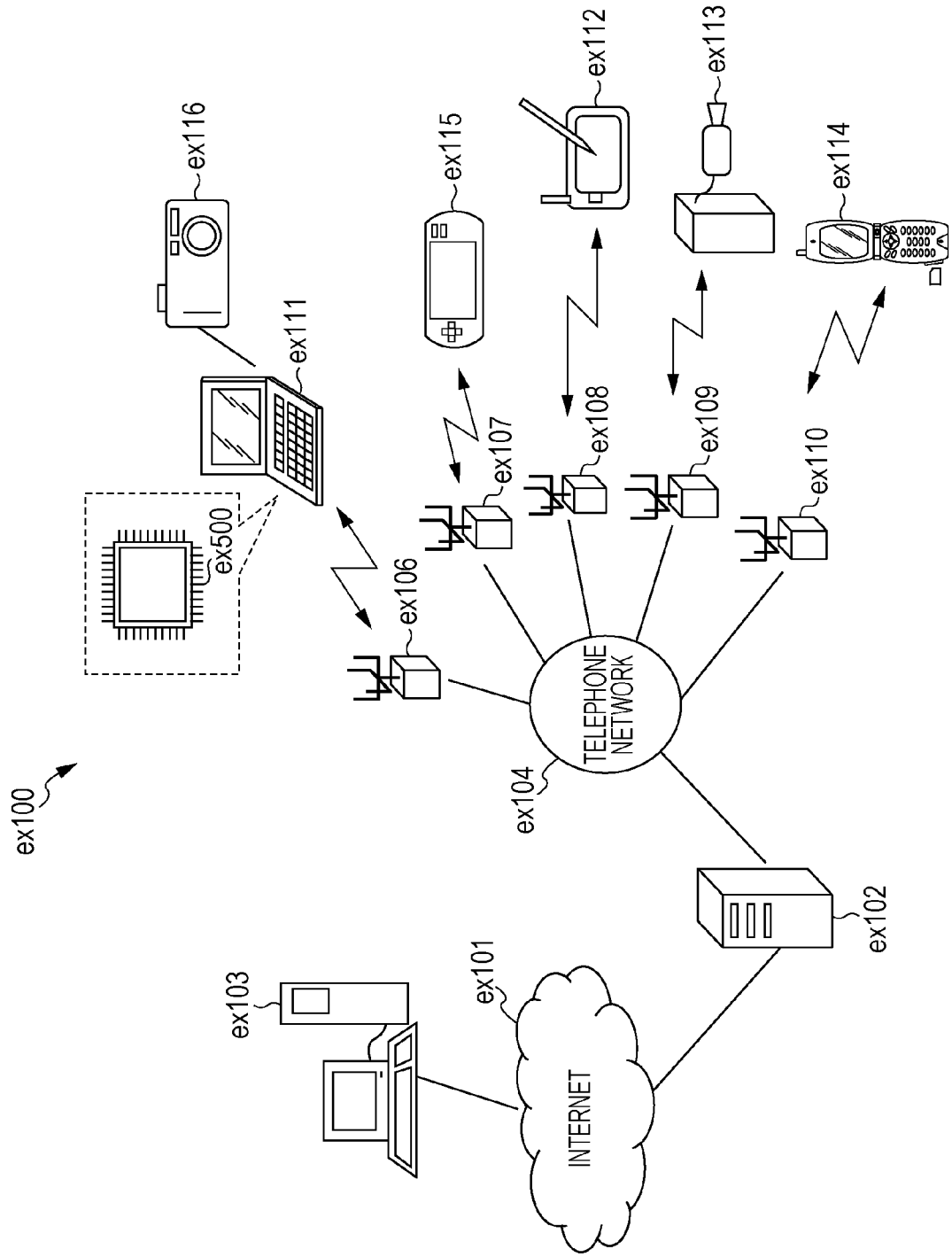
FIG. 10 is a diagram illustrating the overall configuration of a content providing system that implements content distribution services.

FIG. 10 is a diagram illustrating an overall configuration of content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as computer ex111, PDA (Personal Digital Assistant) ex112, camera ex113, mobile phone ex114, game machine ex115 are connected to Internet ex101 via Internet service provider ex102, telephone network ex104, and base stations ex106 to ex110.

Note that the configuration of content providing system ex100 is not limited to the configuration illustrated in FIG. 10, and any given combination of the elements may be connected. Also, the individual devices may be directly connected to telephone network ex104 instead of via base stations ex106 to ex110 which are fixed wireless stations. Alternatively, the individual devices may be directly interconnected via near field communication or the like.

Camera ex113 is a device capable of capturing moving images, such as a digital camcorder. Camera ex116 is a device capable of capturing still images and moving images, such as a digital camera. Also, mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In content providing system ex100, camera ex113 or the like is connected to streaming server ex103 via base station ex109 and telephone network ex104. In this way, live streaming is implemented. During live streaming, the encoding process is performed on content (for example, video of a music event) obtained by the user using camera ex113 in a manner as described in the above-described exemplary embodiment (that is, camera ex113 functions as an image encoding apparatus according to one aspect of the present disclosure) and the resulting content is transmitted to streaming server ex103. Streaming server ex103 in turn distributes the received content as a stream to a client that has made a request. Examples of the client include computer ex111, PDA ex112, camera ex113, mobile phone ex114, and game machine ex115 capable of decoding the data that has undergone the encoding process. Each device that has received the distributed data performs the decoding process on the received data to reproduce the data (that is, the device functions as an image decoding apparatus according to one aspect of the present disclosure).

Note that the encoding process may be performed on the obtained data by camera ex113, by streaming server ex103 that performs a data transmission process, or by both of them on a processing-sharing basis. Similarly, the decoding process may be performed on the distributed data by the client, by streaming server ex103, or by both of them on a processing-sharing basis. Also, in addition to still and/or moving image data obtained by camera ex113, still and/or moving image data obtained by camera ex116 may be transmitted to streaming server ex103 via computer ex111. In this case, the encoding process may be performed by any of camera ex116, computer ex111, and streaming server ex103, or by all of them on a processing-sharing basis.

These encoding and decoding processes are performed in general by LSI ex500 included in computer ex111 or each device. LSI ex500 may be formed as a single chip or a plurality of chips. Alternatively, software for video encoding/decoding may be recorded on a recording medium (such as a CD-ROM, a flexible disk, or a hard disk) that is readable by computer ex111 or the like, and the encoding and decoding processes may be performed using the software. Further, in the case where mobile phone ex114 is equipped with a camera, moving image data obtained with the camera may be transmitted. This moving image data is data that has been encoded by LSI ex500 included in mobile phone ex114.

Also, streaming server ex103 may be constituted by a plurality of servers or a plurality of computers that process, record, and distribute data in a distributed manner.

In the above-described manner, content providing system ex100 allows the client to receive and reproduce encoded data. Accordingly, content providing system ex100 allows the client to receive, decode, and reproduce information transmitted by a user in real time, and thus allows a user not having a special right or equipment to implement personal broadcasting.

Figure 11:
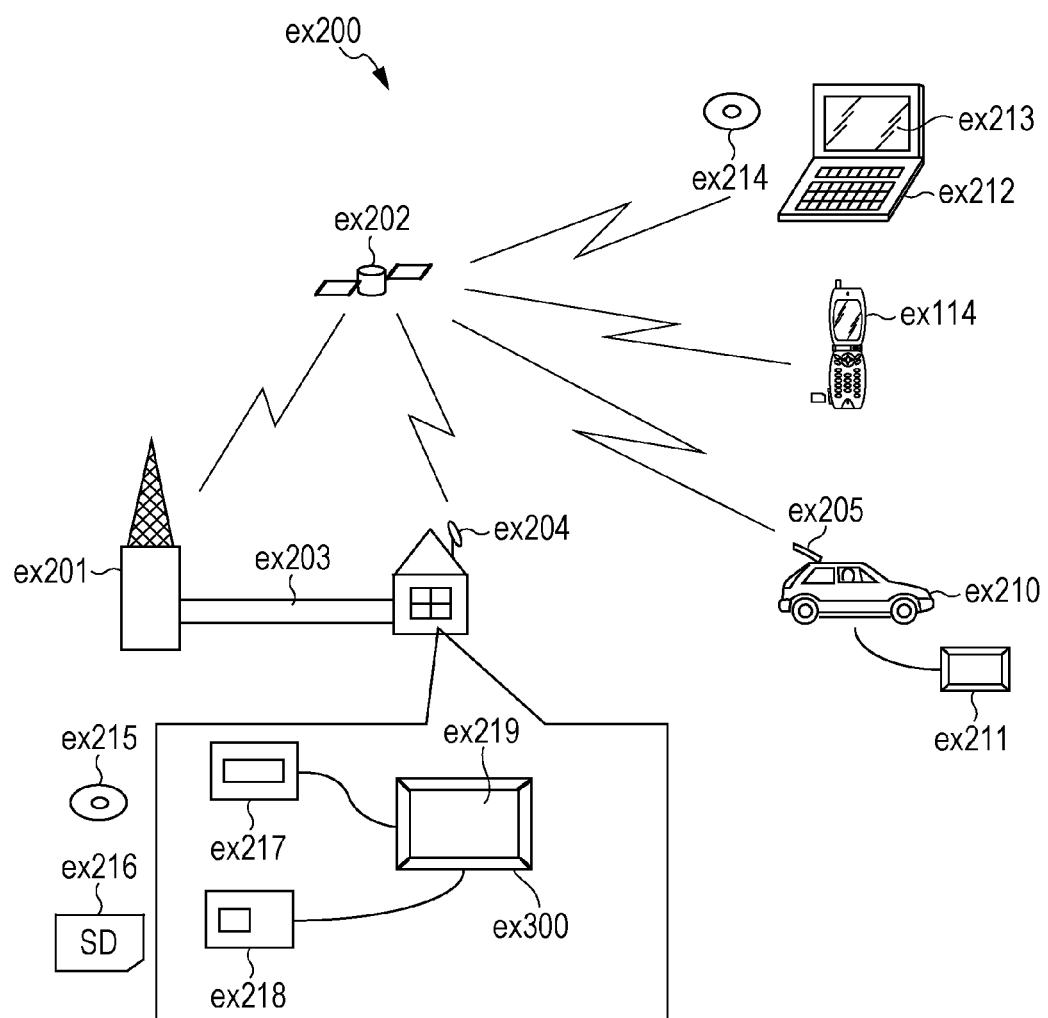
FIG. 11 is a diagram illustrating the overall configuration of a digital broadcasting system.

In addition to the example of content providing system ex100, at least one of the video encoding apparatus (image encoding apparatus) and the video decoding apparatus (image decoding apparatus) according to the above-described exemplary embodiment can be incorporated in digital broadcasting system ex200 as illustrated in FIG. 11. Specifically, broadcasting station ex201 transmits multiplexed data obtained by multiplexing music data, and the like onto video data, via a radio wave, to communication or broadcasting satellite ex202. This video data is data encoded using the video encoding method described in the above-described exemplary embodiment (that is, data encoded by the image encoding apparatus according to one aspect of the present disclosure). Upon receipt of this data, broadcasting satellite ex202 transmits a broadcasting radio wave, and home antenna ex204 capable of receiving satellite broadcasting receives this radio wave. An apparatus such as television (receiver) ex300 or set top box (STB) ex217 decodes and reproduces the received multiplexed data (that is, the apparatus functions as the image decoding apparatus according to one aspect of the present disclosure).

Also, the video decoding apparatus or the video encoding apparatus described in the above-described exemplary embodiment can be implemented in reader/recorder ex218 that reads and decodes the multiplexed data recorded on recording medium ex215 such as a DVD (Digital Versatile Disc) or a BD (Blu-ray Disc); or that encodes a video signal and further multiplexes a music signal with the video signal depending on circumstances, and writes the resulting signal on recording medium ex215. In this case, the reproduced video signal is displayed on monitor ex219, and the video signal can be reproduced by another apparatus or system using recording medium ex215 having the multiplexed data recorded thereon. Alternatively, the video decoding apparatus may be implemented in set top box ex217 connected to cable ex203 for cable television or antenna ex204 for satellite/terrestrial broadcasting, and the video signal may be displayed on monitor ex219 of television ex300. At this time, the video decoding apparatus may be incorporated into television ex300 instead of set top box ex217.

Figure 12:
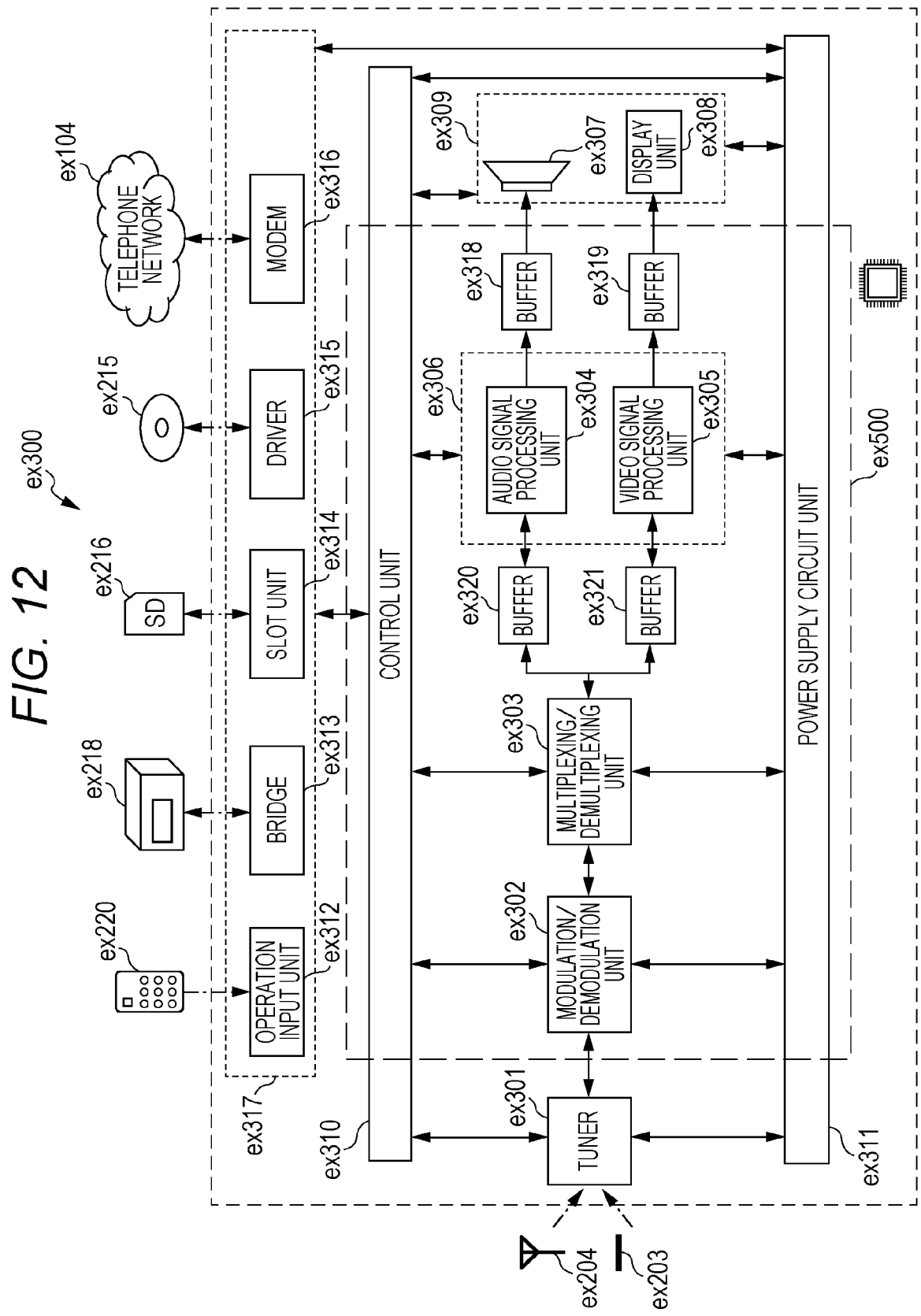
FIG. 12 is a block diagram illustrating an example of a configuration of a television.

FIG. 12 is a diagram illustrating television (receiver) ex300 that employs the video decoding method and the video encoding method described in the exemplary embodiment above. Television ex300 includes tuner ex301 that obtains or outputs, via antenna ex204 or cable ex203 that receives broadcasting, multiplexed data in which video data and audio data are multiplexed together; modulation/demodulation unit ex302 that performs demodulation on the received multiplexed data or modulation on multiplexed data to be transmitted to outside; and multiplexing/demultiplexing unit ex303 that demultiplexes the demodulated multiplexed data into video data and audio data, or multiplexes video data and audio data that have been encoded by signal processing unit ex306.

Television ex300 also includes signal processing unit ex306 and output unit ex309. Signal processing unit ex306 includes audio signal processing unit ex304 that decodes or encodes audio data, and video signal processing unit ex305 that decodes or encodes video data (video signal processing unit ex305 functions as the image encoding apparatus or the image decoding apparatus according to one aspect of the present disclosure). Output unit ex309 includes speaker ex307 that outputs the decoded audio signal, and display unit ex308, such as a display, that displays the decoded video signal. Television ex300 further includes interface unit ex317 which includes operation input unit ex312 that accepts input of a user operation. Television ex300 further includes control unit ex310 that controls the individual units in an integrated manner, and power supply circuit unit ex311 that supplies electric power to the individual units. Interface unit ex317 may include bridge ex313 to be connected to an external device, such as reader/recorder ex218; slot unit ex314 that enables connection of recording medium ex216 such as an SD card; driver ex315 for connection to external recording medium ex215, such as a hard disk; and modem ex316 for connection to telephone network ex104 as well as operation input unit ex312. Note that recording medium ex216 is capable of electrically storing information by using a nonvolatile/volatile semiconductor memory included therein. The individual units of television ex300 are connected to one another via a synchronization bus.

First, a configuration that allows television ex300 to decode and reproduce multiplexed data obtained from outside with antenna ex204 or the like will be described. Television ex300 receives a user operation from remote control ex220 or the like. Based on control performed by control unit ex310 including a CPU or the like, multiplexing/demultiplexing unit ex303 demultiplexes multiplexed data that has been demodulated by modulation/demodulation unit ex302. Further, in television ex300, audio signal processing unit ex304 decodes the separated audio data and video signal processing unit ex305 decodes the separated video data by using the decoding method described in the above exemplary embodiment. Further, the decoded audio signal and video signal are output to outside from output unit ex309. When the audio signal and the video signal are output, these signals may be temporarily stored in buffers ex318 and ex319 or the like such that they are reproduced in synchronization with each other. Also, television ex300 may read multiplexed data from recording media ex215 and ex216 such as a magnetic/optical disc and an SD card as well as from broadcasting. Next, a configuration that allows television ex300 to encode an audio signal and a video signal and to transmit the resulting signals to outside or write the resulting signals on a recording medium or the like will be described. Television ex300 receives a user operation from remote control ex220 or the like. Based on control performed by control unit ex310, audio signal processing unit ex304 encodes the audio signal, and video signal processing unit ex305 encodes the video signal by using the encoding method described in the above exemplary embodiment. The encoded audio signal and video signal are multiplexed by multiplexing/demultiplexing unit ex303 and the resulting multiplexed signal is output to outside. When the audio signal and the video signal are multiplexed, these signals may be temporarily stored in buffers ex320 and ex321 or the like such that they are synchronized with each other. Note that a plurality of buffers may be provided as illustrated as buffers ex318, ex319, ex320, and ex321; or one or more buffers may be shared. Further, in addition to the illustrated buffers, for example, data may be stored in a buffer that serves as a buffering member for avoiding an overflow or underflow in the system between modulation/demodulation unit ex302 and multiplexing/demultiplexing unit ex303 or the like.

Television ex300 may also include a configuration for receiving audio/video input of a microphone or a camera in addition to the configuration for obtaining audio data and video data from broadcasting, a recording medium, or the like; and may perform the encoding process on the data obtained therefrom. Although television ex300 has been described as the configuration capable of performing the above-described encoding process, multiplexing, and outputting to outside, television ex300 may be a configuration incapable of performing these processes and only capable of the reception, decoding process, and outputting to outside.

In the case where multiplexed data is read from and written to a recording medium by reader/recorder ex218, the decoding process or the encoding process may be performed by television ex300, by reader/recorder ex218, or by both television ex300 and reader/recorder ex218 on a processing-sharing basis.

Figure 13:
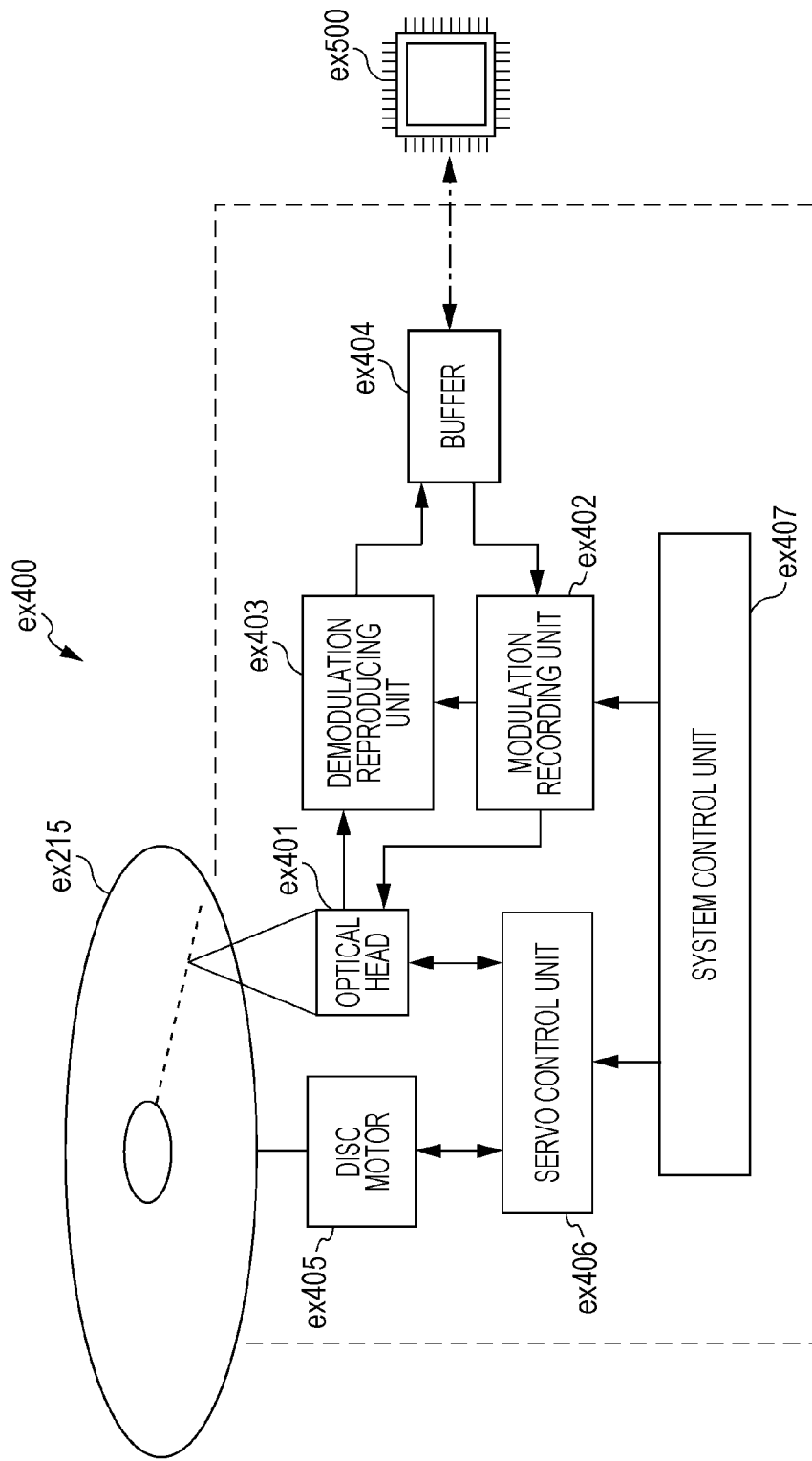
FIG. 13 is a block diagram illustrating an example of a configuration of an information reproducing/recording unit that reads information from and writes information to a recording medium which is an optical disc.

FIG. 13 illustrates an example of a configuration of information reproducing/recording unit ex400 in the case of reading data from and writing data to an optical disc. Information reproducing/recording unit ex400 includes optical head ex401, modulation recording unit ex402, demodulation reproducing unit ex403, buffer ex404, disc motor ex405, survo control unit ex406, and system control unit ex407. Optical head ex401 irradiates a recording surface of recording medium ex215, which is an optical disc, with a laser spot to write information thereon; and detects reflected light from the recording surface of recording medium ex215 to read information. Modulation recording unit ex402 electrically drives a semiconductor laser included in optical head ex401 to modulate a laser beam in accordance with to-be-recorded data. Demodulation reproducing unit ex403 amplifies a reproduced signal which is obtained by electrically detecting reflected light from the recording surface by a photodetector included in optical head ex401, separates and demodulates signal components recorded on recording medium ex215, and reproduces necessary information. Buffer ex404 temporarily stores information to be recorded on recording medium ex215 and information reproduced from recording medium ex215. Disc motor ex405 rotates recording medium ex215. Survo control unit ex406 moves optical head ex401 to a certain information track while controlling rotational driving of disc motor ex405 to perform a laser spot tracking process. System control unit ex407 controls information reproducing/recording unit ex400. The above-described reading and writing processes are implemented as a result of system control unit ex407 performing recording/reproduction of information via optical head ex401 while causing modulation recording unit ex402, demodulation reproducing unit ex403, and survo control unit ex406 to operate in cooperation with one another and using various pieces of information held in buffer ex404 and generating/adding new information as needed. System control unit ex407 includes, for example, a microprocessor and performs these processes by executing a read/write program.

Although optical head ex401 that irradiates the recording surface with a laser spot has been described above, optical head ex401 may include a configuration for performing high-density recording using near field light.

Figure 14:
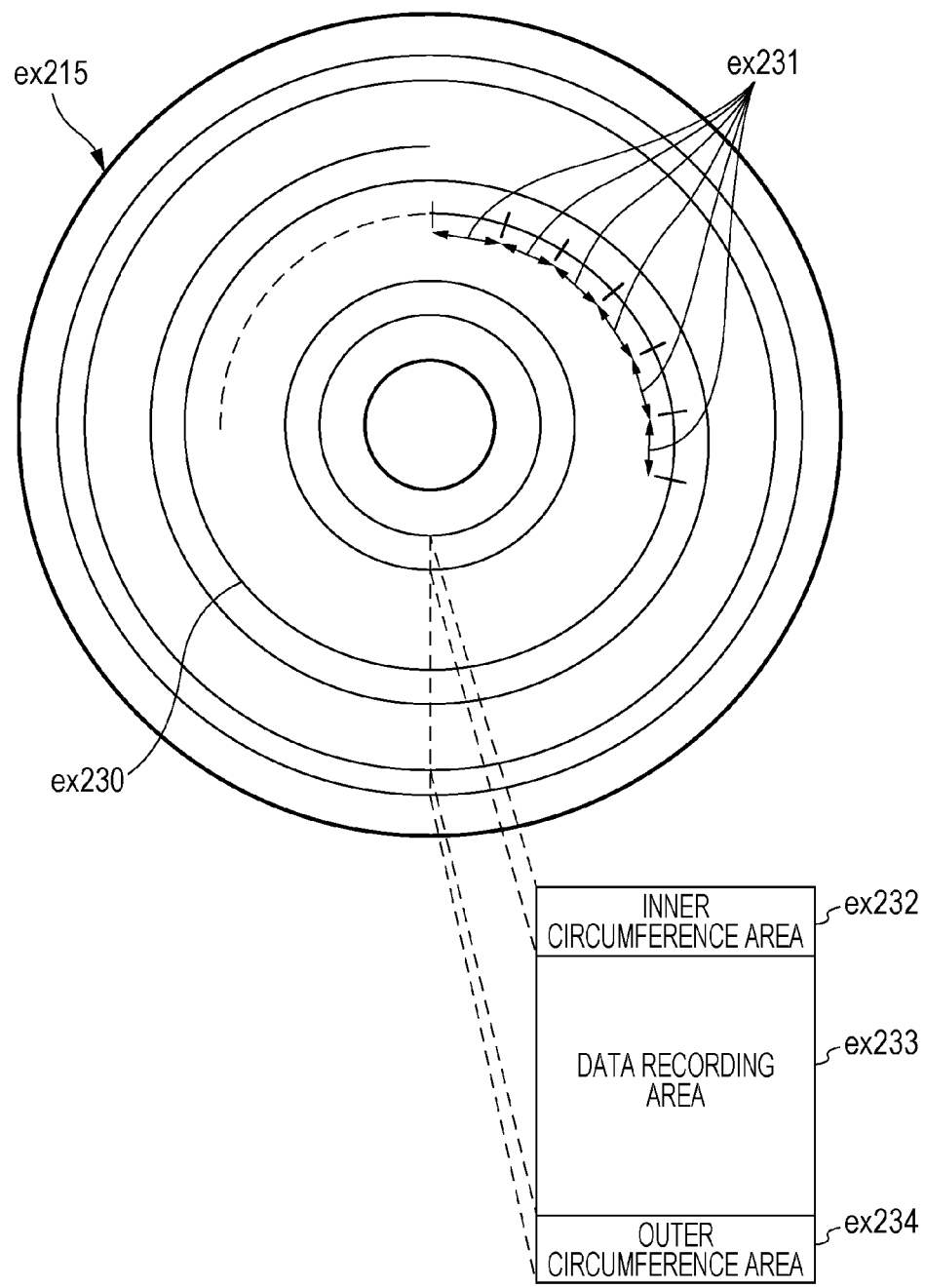
FIG. 14 is a diagram illustrating an example of a structure of an optical disc recording medium.

FIG. 14 is a schematic diagram of recording medium ex215 which is an optical disc. On the recording surface of recording medium ex215, a guide groove (groove) is spirally formed. In information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing information track ex230 and reading the address information. Also, recording medium ex215 includes data recording area ex233, inner circumference area ex232, and outer circumference area ex234. Data recording area ex233 is an area used for recording user data. Inner circumference area ex232 and outer circumference area ex234 that are located on the inner side and the outer side of data recording area ex233, respectively, are used for purposes other than recording of user data. Information reproducing/recording unit ex400 performs reading/writing of encoded audio data, encoded video data, or multiplexed data of these pieces of data on data recording area ex233 of recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in digital broadcasting system ex200, data may be received by vehicle ex210 equipped with antenna ex205 from broadcasting satellite ex202 or the like and a moving image may be reproduced on a display device of car navigation system ex211 mounted on vehicle ex210. Note that the configuration illustrated in FIG. 12 additionally including a GPS reception unit is conceivable as the configuration of car navigation system ex211, and the same applies to computer ex111, mobile phone ex114, or the like.

Figure 15A:
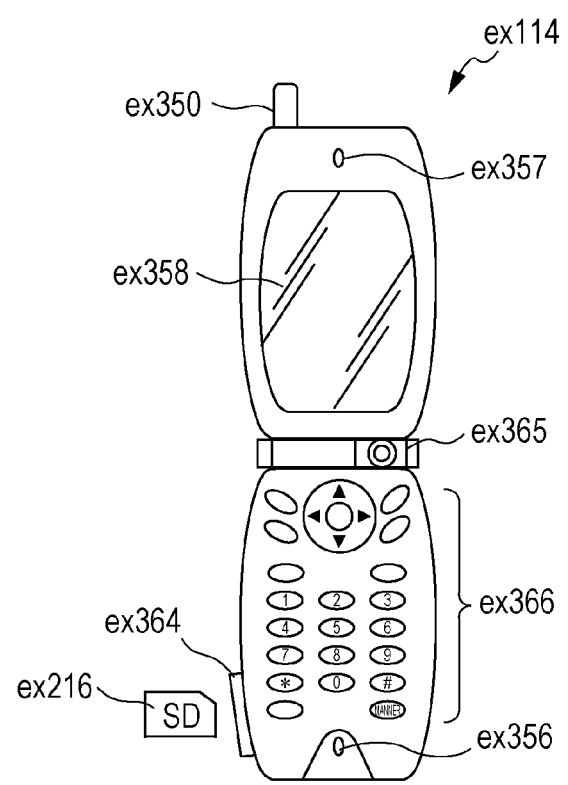
FIG. 15A is a diagram illustrating an example of a mobile phone.

FIG. 15A is a diagram illustrating mobile phone ex114 that employs the video decoding method and the video encoding method described in the above exemplary embodiment. Mobile phone ex114 includes antenna ex350 that transmits and receives a radio wave to and from base station ex110; camera unit ex365 capable of capturing video and still images; and display unit ex358, such as a liquid crystal display, that displays the video captured by camera unit ex365 and data obtained by decoding video or the like received with antenna ex350. Mobile phone ex114 further includes a body including operation key unit ex366; audio output unit ex357 such as a speaker for outputting audio; audio input unit ex356 such as a microphone for inputting audio; memory unit ex367 that stores encoded data or decoded data of captured video, captured still images, recorded audio, received video, received still images, or received emails; and slot unit ex364 which is an interface to a recording medium which similarly stores data thereon.

Figure 15B:
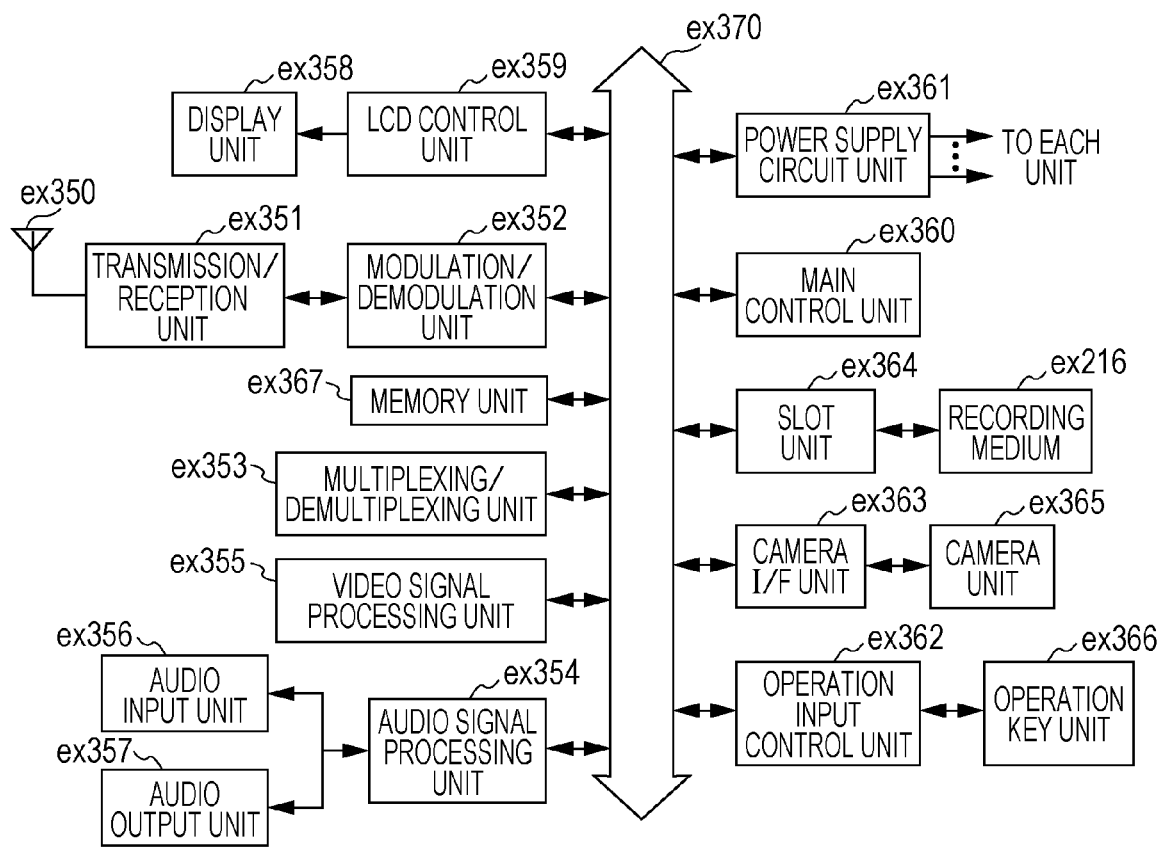
FIG. 15B is a block diagram illustrating an example of a configuration of the mobile phone.

Further, an example of a configuration of mobile phone ex114 will be described with reference to FIG. 15B. Mobile phone ex114 includes main control unit ex360 that controls individual units of the body which includes display unit ex358 and operation key unit ex366 in an integrated manner. Mobile phone ex114 also includes power supply circuit unit ex361, operation input control unit ex362, video signal processing unit ex355, camera interface unit ex363, LCD (Liquid Crystal Display) control unit ex359, modulation/demodulation unit ex352, multiplexing/demultiplexing unit ex353, audio signal processing unit ex354, slot unit ex364, and memory unit ex367 which are connected to main control unit ex360 via bus ex370.

When an on-hook/power key is turned on through a user operation, power supply circuit unit ex361 supplies electric power to individual units from a battery pack to activate mobile phone ex114 into an operable state.

In mobile phone ex114, in a voice call mode, audio signal processing unit ex354 converts an audio signal obtained by audio input unit ex356 into a digital audio signal, modulation/demodulation unit ex352 performs spread spectrum processing on this digital audio signal, and transmission/reception unit ex351 performs digital-to-analog conversion processing and frequency conversion processing on this signal and then transmits the resulting signal via antenna ex350 in accordance with control performed by main control unit ex360 which includes a CPU, a ROM, and a RAM. Also, in mobile phone ex114, in the voice call mode, transmission/reception unit ex351 amplifies reception data received via antenna ex350 and performs frequency conversion processing and analog-to-digital conversion processing, modulation/demodulation unit ex352 performs spread spectrum processing on the resulting signal, audio signal processing unit ex354 converts the resulting signal into an analog audio signal. The analog audio signal is then output from audio output unit ex357.

In the case where an email is transmitted in a data communication mode, text data of the email input through operation of operation key unit ex366 of the body or the like is sent to main control unit ex360 via operation input control unit ex362. Main control unit ex360 performs control such that modulation/demodulation unit ex352 performs spread spectrum processing on the text data and transmission/reception unit ex351 performs digital-to-analog conversion processing and frequency conversion processing on the text data and then transmits the resulting text data to base station ex110 via antenna ex350. In the case of receiving an email, substantially the opposite processing is performed on the received data, and the resulting text data is output to display unit ex358.

In the case where video, a still image, or a combination of video and audio are transmitted in the data communication mode, video signal processing unit ex355 compresses and encodes a video signal supplied from camera unit ex365 by using the video encoding method described in the above exemplary embodiment (that is, video signal processing unit ex355 functions as the image encoding apparatus according to one aspect of the present disclosure), and sends the encoded video data to multiplexing/demultiplexing unit ex353. Also, audio signal processing unit ex354 encodes an audio signal obtained by audio input unit ex356 while the video, still image, or the like is being captured by camera unit ex365, and sends the encoded audio data to multiplexing/demultiplexing unit ex353.

Multiplexing/demultiplexing unit ex353 multiplexes the encoded video data supplied from video signal processing unit ex355 and the encoded audio data supplied from audio signal processing unit ex354 in accordance with a certain scheme. Modulation/demodulation unit (modulation/demodulation circuit unit) ex352 performs spread spectrum processing on the resulting multiplexed data. Transmission/reception unit ex351 performs digital-to-analog conversion processing and frequency conversion processing on the multiplexed data, and then transmits the resulting data via antenna ex350.

In the case of receiving data of a moving image file linked to a website or the like or an email attached with video or audio in the data communication mode, multiplexing/demultiplexing unit ex353 demultiplexes multiplexed data into a bitstream of video data and a bitstream of audio data in order to decode the multiplexed data received via antenna ex350. Multiplexing/demultiplexing unit ex353 supplies the encoded video data to video signal processing unit ex355 and the encoded audio data to audio signal processing unit ex354 via synchronization bus ex370. Video signal processing unit ex355 performs decoding using a video decoding method corresponding to the video encoding method described in the above exemplary embodiment to decode the video signal (that is, video signal processing unit ex355 functions as the image decoding apparatus according to one aspect of the present disclosure). Then, for example, video or still image included in the moving image file linked to the website is displayed on display unit ex358 via LCD control unit ex359. Also, audio signal processing unit ex354 decodes the audio signal, and the resulting audio is output by audio output unit ex357.

Like television ex300, three implementation forms, that is, a transmission/reception terminal including both an encoder and a decoder, a transmission terminal only including an encoder, and a reception terminal only including a decoder, are conceivable for a terminal such as mobile phone ex114. Further, the case has been described in which multiplexed data in which video data, audio data, and so forth are multiplexed is received and transmitted in digital broadcasting system ex200; however, the multiplexed data may be data in which text data related to the video is multiplexed other than audio data or video data alone may be used instead of the multiplexed data.

As described above, the video encoding method or the video decoding method described in the above exemplary embodiment is applicable to any of the aforementioned devices and systems. In such a way, advantages described in the above exemplary embodiment can be obtained.

Also, the present disclosure is not limited to the exemplary embodiment above, and various modifications and corrections can be made without departing from the scope of the present disclosure.

Third Exemplary Embodiment

Video data can also be generated by switching between the video encoding method or apparatus described in each of the above exemplary embodiments and a video encoding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video encoding method or apparatus described in each of the above exemplary embodiments will be described below. Multiplexed data is a digital stream in the MPEG-2 transport stream formant.

FIG. 16 is a diagram illustrating a structure of multiplexed data. As illustrated in FIG. 16, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window.

The video stream is encoded using the video encoding method or apparatus described in each of the above exemplary embodiments and using the video encoding method or apparatus compliant with an existing standard, such as MPEG-2, MPEG-4 AVC, or VC-1. The audio stream is encoded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 17:
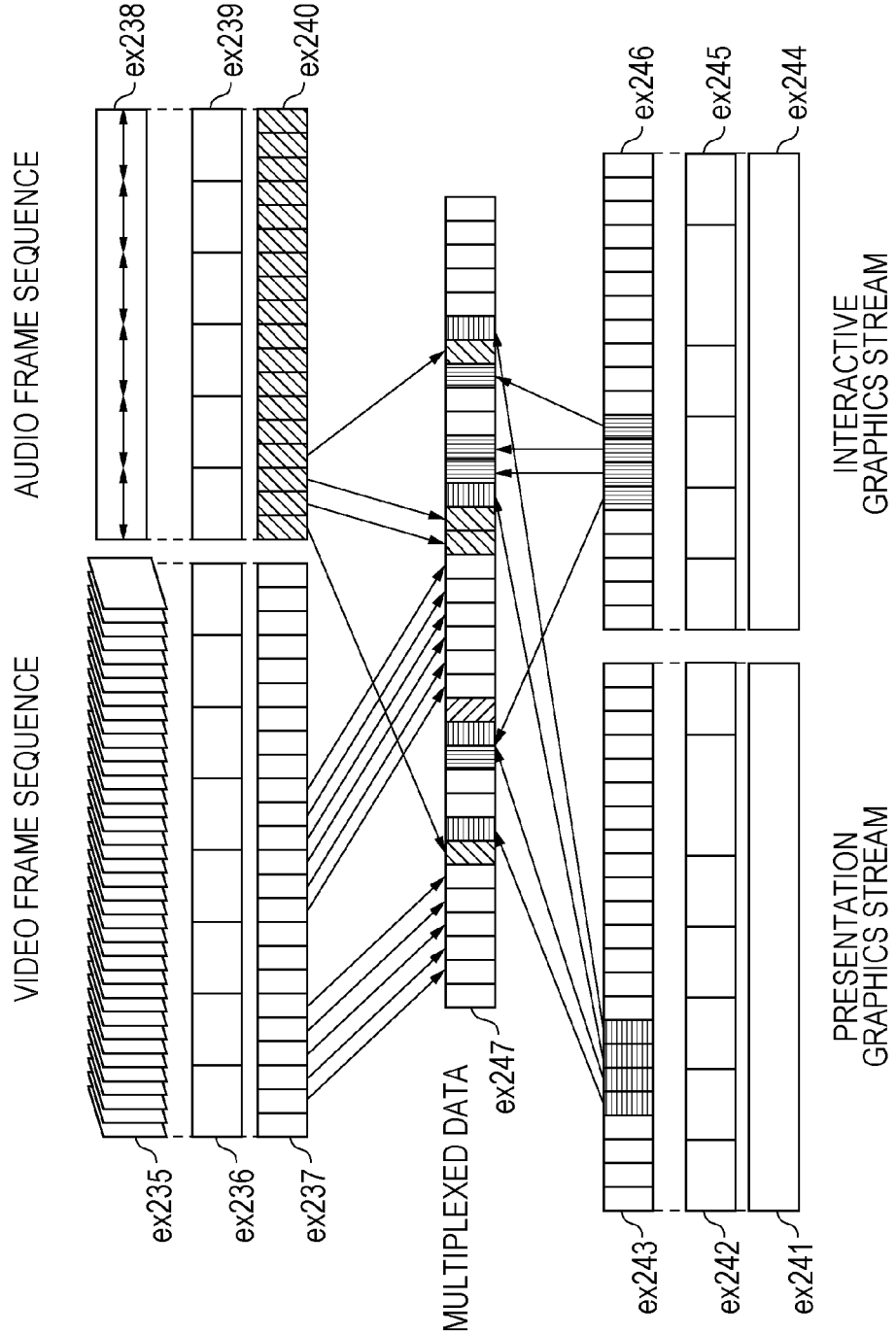
FIG. 17 is a diagram schematically illustrating how individual streams are multiplexed into multiplexed data.

FIG. 17 is a diagram schematically illustrating how individual streams are multiplexed into multiplexed data. Video stream ex235 made up of a plurality of video frames and audio stream ex238 made up of a plurality of audio frames are converted into PES (Packetized Elementary Stream) packet sequences ex236 and ex239, and then into TS (Transport Stream) packets ex237 and ex240, respectively. Likewise, data of presentation graphics stream ex241 and data of interactive graphics stream ex244 are converted into PES packet sequences ex242 and ex245, and further into TS packets ex243 and ex246, respectively. Multiplexed data ex247 is formed by multiplexing these TS packets into one stream.

Figure 18:
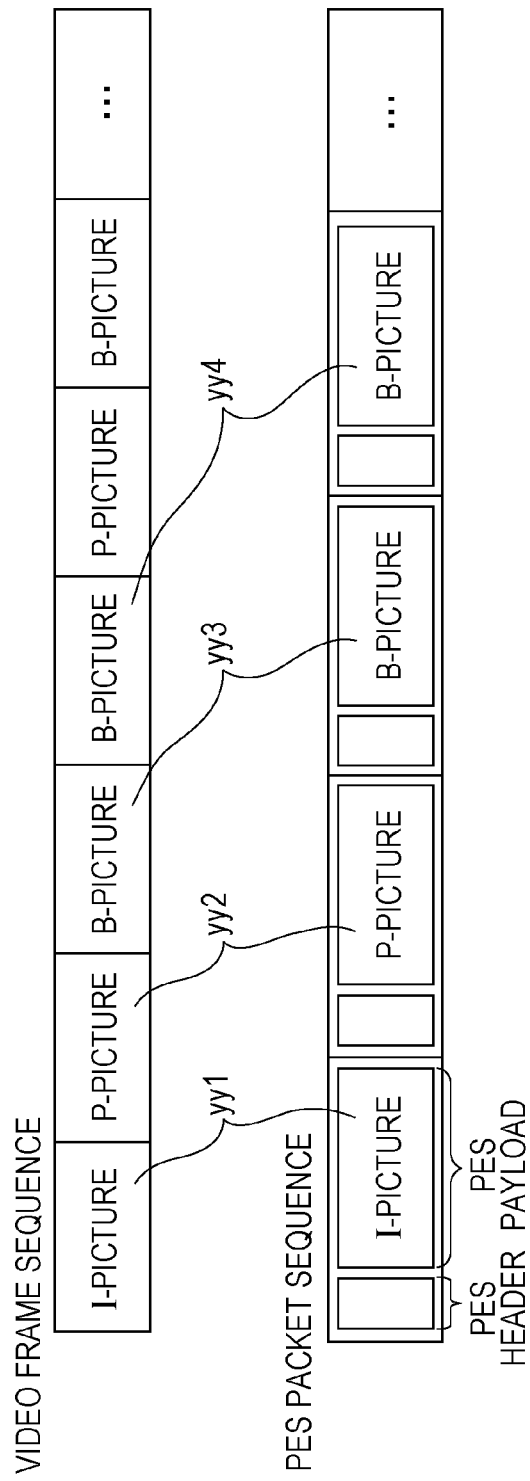
FIG. 18 is a diagram illustrating how a video stream is stored in a PES (Packetized Elementary Stream) packet sequence in a more detailed manner.

FIG. 18 illustrates how a video stream is stored in a PES packet sequence in detail. The upper row in FIG. 18 illustrates a video frame sequence of the video stream. The lower row illustrates a PES packet sequence. As denoted by arrows yy1, yy2, yy3, and yy4 in FIG. 18, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time- Stamp) that represents display time of the picture and DTS (Decoding Time-Stamp) that represents decoding time of the picture are stored.

Figure 19:
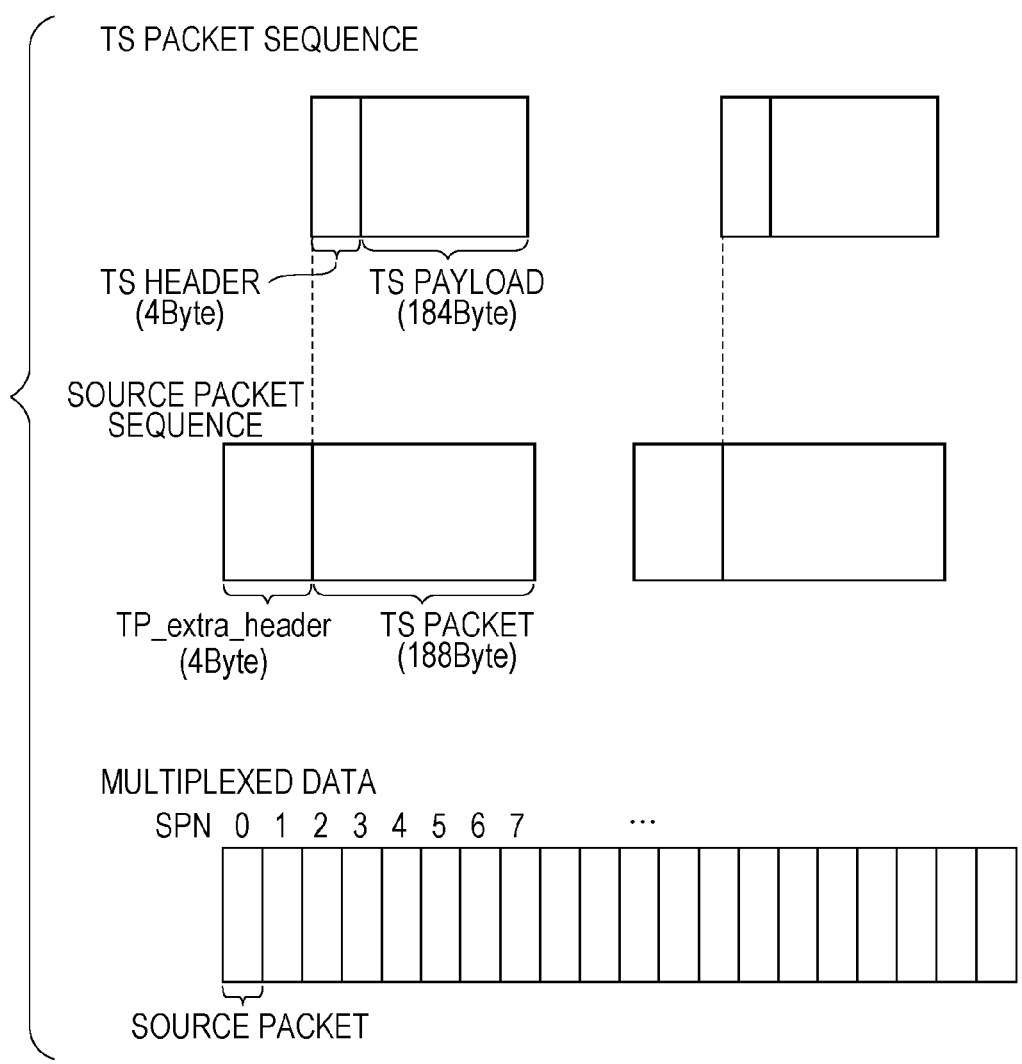
FIG. 19 is a diagram illustrating structures of a TS (Transport Stream) packet and a source packet in multiplexed data.

FIG. 19 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 19, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 20:
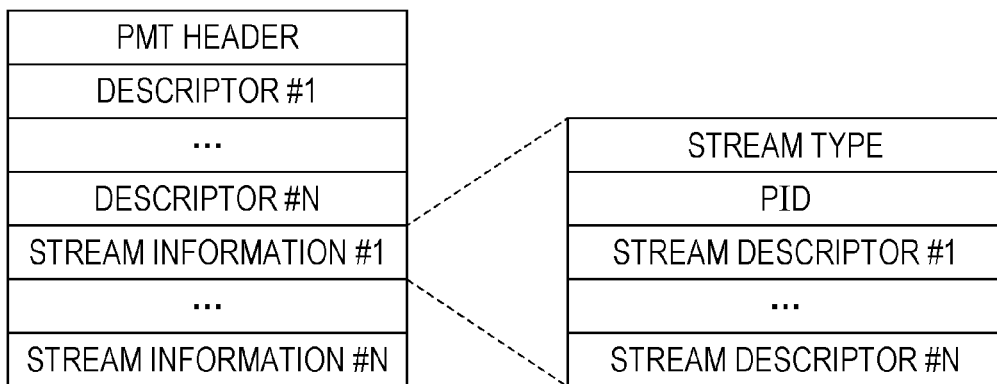
FIG. 20 is a diagram illustrating a data structure of a PMT (Program Map Table)

FIG. 20 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 21:
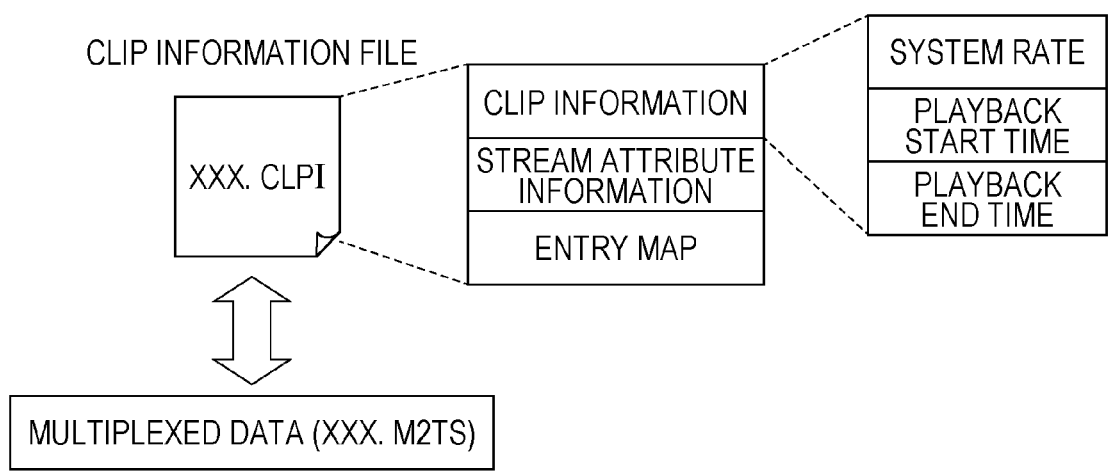
FIG. 21 is a diagram illustrating an internal structure of multiplexed data information.

As illustrated in FIG. 21, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 21. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 22:
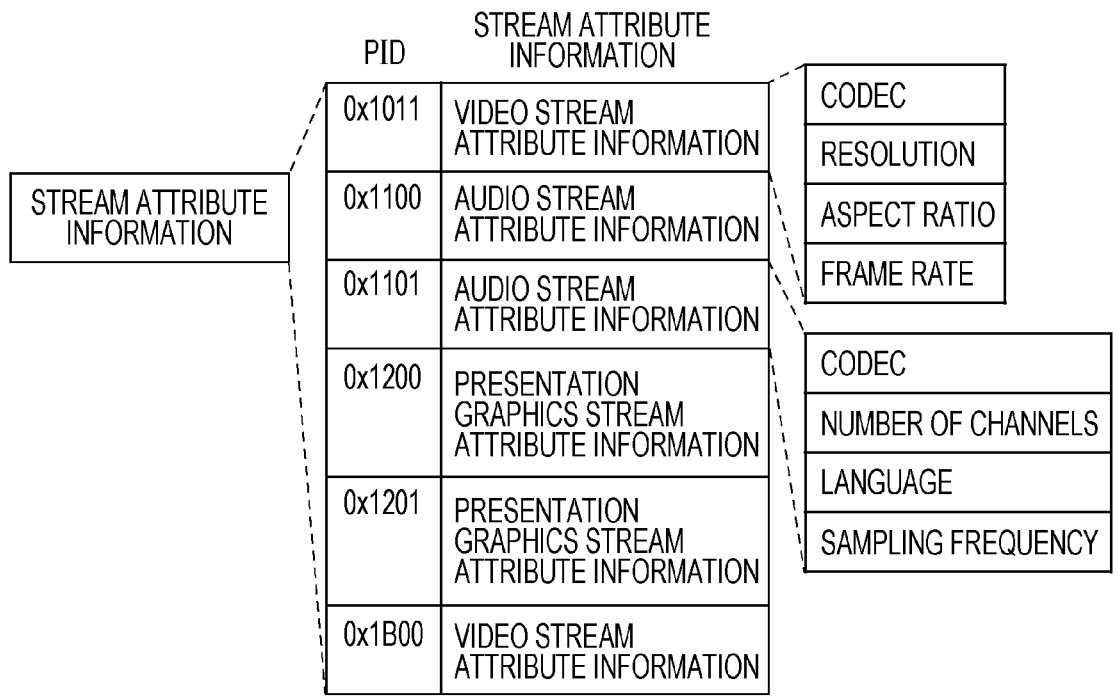
FIG. 22 is a diagram illustrating an internal structure of stream attribute information.

For each PID, attribute information of a corresponding stream included in the multiplexed data is registered in the stream attribute information as illustrated in FIG. 22. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the third exemplary embodiment, the stream type contained in the PMT is used among the multiplexed data. Also, in the case where the multiplexed data is recorded on a recording medium, the video stream attribute information contained in the multiplexed data information is used. Specifically, the video encoding method or apparatus described in each of the above exemplary embodiments includes a step or unit for setting unique information which indicates whether or not this video data has been generated by the video encoding method or apparatus described in each of the above exemplary embodiments, in the stream type contained in the PMT or the video stream attribute information. With this configuration, video data generated using the video encoding method or apparatus described in each of the above exemplary embodiments and video data based on another standard can be distinguished from each other.

Figure 23:
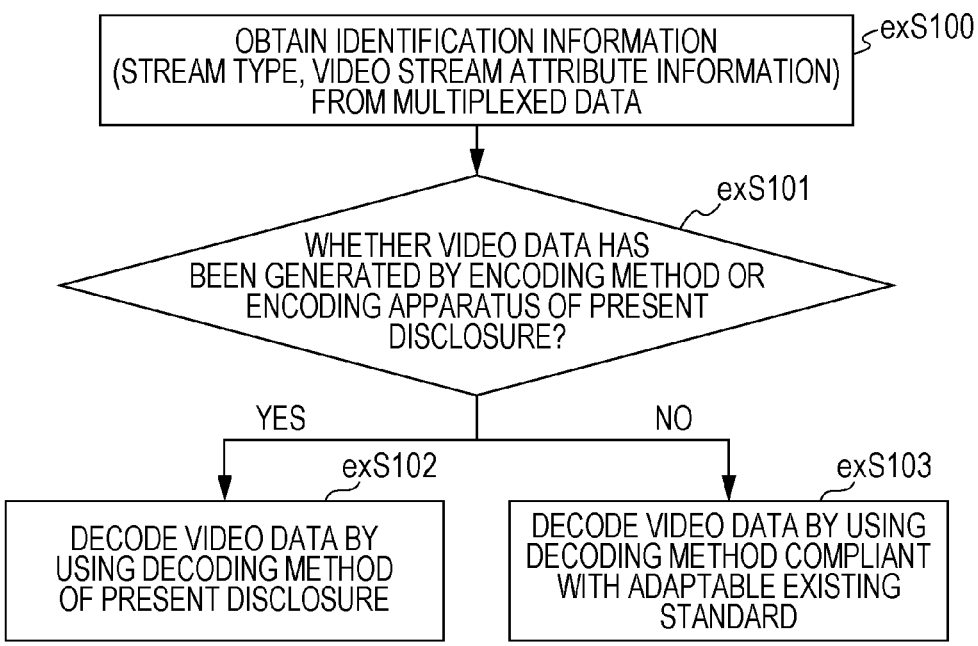
FIG. 23 is a diagram illustrating steps for identifying video data.

FIG. 23 illustrates steps included in a video decoding method in accordance with the third exemplary embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video encoding method or apparatus described in each of the above exemplary embodiments. If it is determined from the stream type or the video stream attribute information that this multiplexed data has been generated using the video encoding method or apparatus described in each of the above exemplary embodiments, decoding is performed using the video decoding method described in each of the above exemplary embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video encoding method or apparatus or the video decoding method or apparatus described in the third exemplary embodiment is applicable to any of the aforementioned devices and systems.

Fourth Exemplary Embodiment

Figure 24:
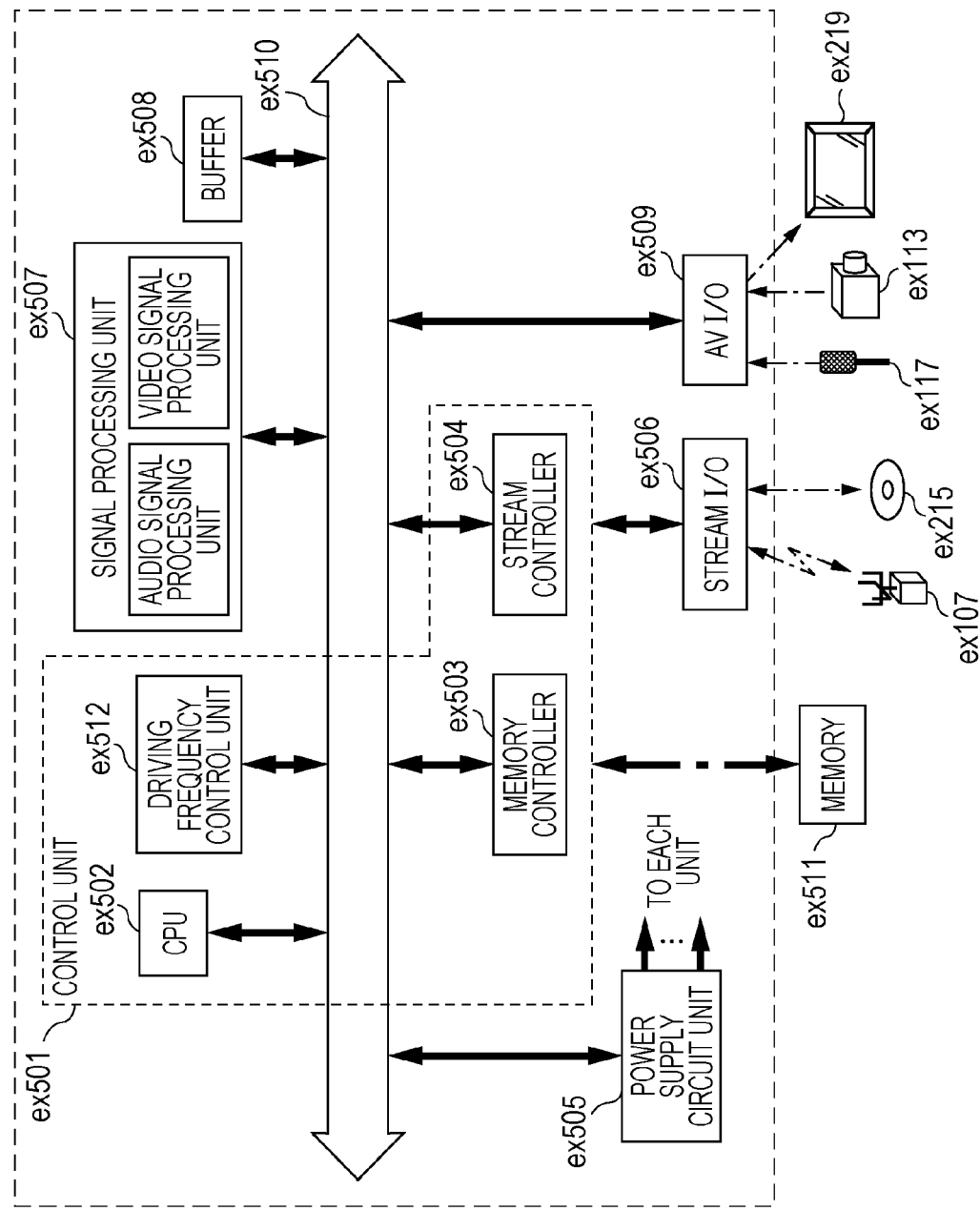
FIG. 24 is a block diagram illustrating a configuration example of an integrated circuit that implements a video encoding method and video decoding method of each exemplary embodiment.

The video encoding method and apparatus and the video decoding method and apparatus described in each of the above exemplary embodiments are typically implemented using an LSI which is an integrated circuit. FIG. 24 illustrates an example of a configuration of LSI ex500 which is formed as one chip. LSI ex500 includes control unit ex501, CPU ex502, memory controller ex503, stream controller ex504, power supply circuit unit ex505, stream input/output (I/O) ex506, signal processing unit ex507, buffer ex508, and audio/video (AV) I/O ex509, which are connected to one another via bus ex510. Upon power-on, power supply circuit unit ex505 supplies electric power to the individual units to activate the individual units into an operable state.

For example, in the case of performing a encoding process, LSI ex500 receives an AV signal from microphone ex117, camera ex113, or the like via AV I/O ex509 in accordance with control performed by control unit ex501 which includes CPU ex502, memory controller ex503, stream controller ex504, and driving frequency control unit ex512. The input AV signal is temporarily stored in external memory ex511, such as an SDRAM (Synchronous Dynamic Random Access Memory). In accordance with control performed by control unit ex501, the stored data is appropriately divided into a plurality of portions in accordance with an amount of processing or a processing speed, and the plurality of portions are sent to signal processing unit ex507. Then, signal processing unit ex507 encodes the audio signal and/or the video signal. The encoding process performed on the video signal here is the encoding process described in each of the above exemplary embodiments. Signal processing unit ex507 further performs processing such as multiplexing of the encoded audio data and the encoded video data depending on circumstances, and outputs the multiplexed data to outside via stream I/O ex506. This output multiplexed data is transmitted to base station ex107 or written to recording medium ex215. Note that the audio data and the video data may be temporarily stored in buffer ex508 at the time of multiplexing such that these pieces of data are synchronized with each other.

Note that although memory ex511 has been described as a device provided outside LSI ex500 above, memory ex511 may be included in LSI ex500. The number of buffers ex508 is not limited to one and LSI ex500 may include a plurality of buffers. Also, LSI ex500 may be formed as a single chip or a plurality of chips.

Although control unit ex501 includes CPU ex502, memory controller ex503, stream controller ex504, and driving frequency control unit ex512 above, the configuration of control unit ex501 is not limited to this one. For example, signal processing unit ex507 may further include a CPU. By providing a CPU within signal processing unit ex507, the processing speed can be further improved. Alternatively, CPU ex502 may include signal processing unit ex507 or, for example, an audio signal processing unit which is part of signal processing unit ex507. In such a case, control unit ex501 includes CPU ex502 which includes signal processing unit ex507 or part of signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacture of an LSI or a reconfigurable processor in which connections and settings of circuit cells within the LSI are reconfigurable may be used. Such a programmable logic device may execute the video encoding method or the video decoding method described in each of the above exemplary embodiments, typically by loading or reading from a memory or the like a program that constitutes software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Fifth Exemplary Embodiment

It is considered that an amount of processing increases in the case of decoding video data generated using the video encoding method or apparatus described in each of the above exemplary embodiments, compared with the case of decoding video data based on an existing standard, such as MPEG-2, MPEG-4 AVC, or VC-1. Accordingly, in LSI ex500, a higher driving frequency needs to be set in CPU ex502 than that used when video data based on an existing standard is decoded. However, making the driving frequency higher undesirably increases power consumption.

Figure 25:
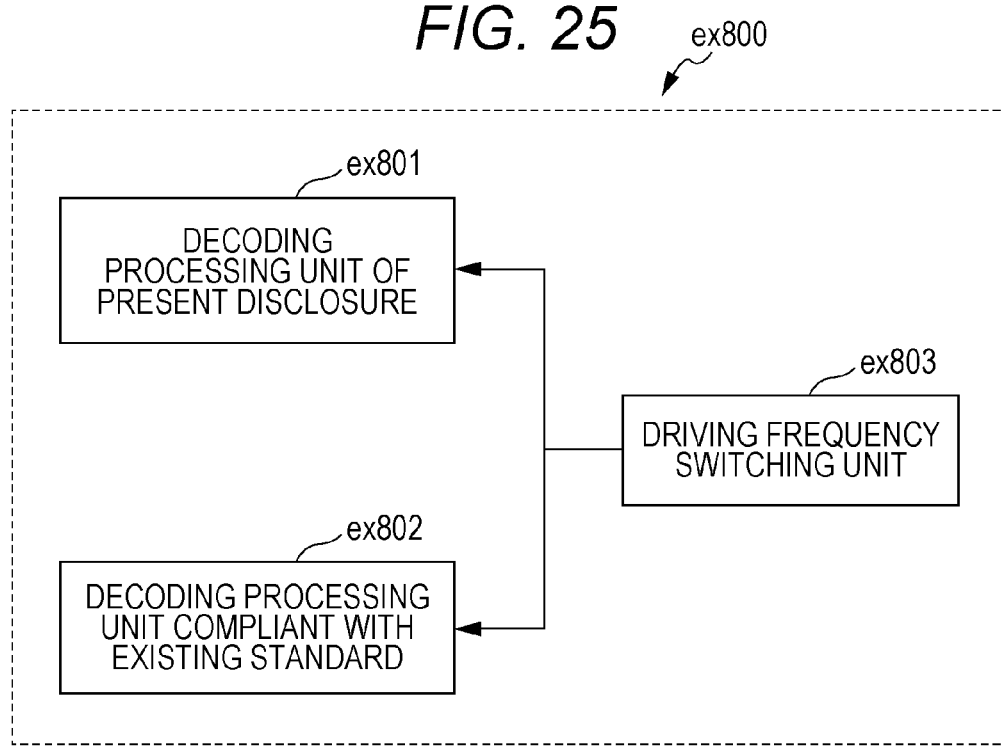
FIG. 25 is a diagram illustrating a configuration for switching between driving frequencies.

To address this issue, the video decoding apparatus, such as television ex300 or LSI ex500, is configured to identify a standard which video data is based on, and to switch between the driving frequencies in accordance with the standard. FIG. 25 illustrates configuration ex800 in accordance with the fifth exemplary embodiment. Driving frequency switching unit ex803 sets the driving frequency high in the case where video data is data that has been generated using the video encoding method or apparatus described in each of the above exemplary embodiments. Driving frequency switching unit ex803 also instructs decoding processing unit ex801 which executes the video decoding method described in each of the above exemplary embodiments to decode the video data. On the other hand, in the case where the video data is data based on an existing standard, driving frequency switching unit ex803 sets the driving frequency lower than that of the case where the video data is data that has been generated using the video encoding method or apparatus described in each of the above exemplary embodiments. Then, driving frequency switching unit ex803 instructs decoding processing unit ex802 compliant with the existing standard to decode the video data.

More specifically, driving frequency switching unit ex803 includes CPU ex502 and driving frequency control unit ex512 illustrated in FIG. 24. Decoding processing unit ex801 that executes the video decoding method described in each of the above exemplary embodiments and decoding processing unit ex802 compliant with an existing standard correspond to signal processing unit ex507 illustrated in FIG. 24. CPU ex502 identifies a standard which video data is based on. Then, based on a signal from CPU ex502, driving frequency control unit ex512 sets the driving frequency. Also, based on a signal from CPU ex502, signal processing unit ex507 decodes the video data. Here, the use of the identification information described in the third exemplary embodiment, for example, in identification of the video data is conceivable. The identification information is not limited to the one described in the third exemplary embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of CPU ex502 in accordance with a lookup table in which the standard for the video data and the driving frequency are associated with each other as illustrated in FIG. 27, for example. The lookup table is stored in buffer ex508 or an internal memory of LSI ex500, and CPU ex502 refers to this lookup table. In this way, the driving frequency can be selected.

Figure 26:
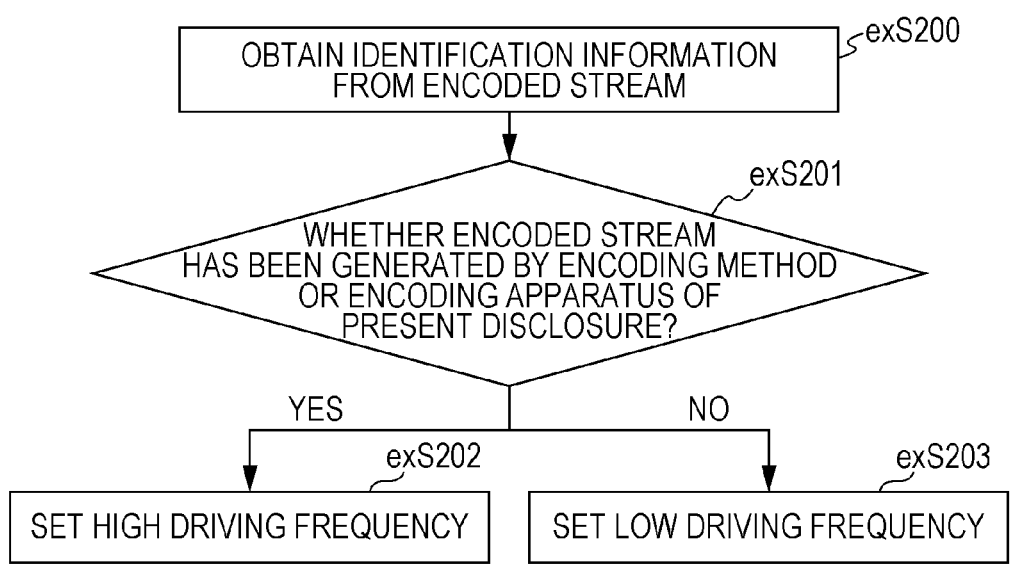
FIG. 26 is a diagram illustrating steps for identifying video data and switching between driving frequencies.

FIG. 26 illustrates steps for performing the method according to the fifth exemplary embodiment. First, in step exS200, signal processing unit ex507 obtains identification information from multiplexed data. Then, in step exS201, based on the identification information, CPU ex502 identifies whether or not video data is video data that has been generated using the video encoding method or apparatus described in each of the above exemplary embodiments. If the video data is video data that has been generated using the video encoding method or apparatus described in each of the above exemplary embodiments, CPU ex502 sends a signal for setting a high driving frequency to driving frequency control unit ex512 in step exS202. Then, driving frequency control unit ex512 sets a high driving frequency. On the other hand, if the identification information indicates that the video data is video data based on an existing standard, such as MPEG-2, MPEG-4 AVC, or VC-1, CPU ex502 sends a signal for setting a low driving frequency to driving frequency control unit ex512 in step exS203. Then, driving frequency control unit ex512 sets a lower driving frequency than that used when the video data is video data that has been generated using the video encoding method or apparatus described in each of the above exemplary embodiments.

Further, by changing a voltage supplied to LSI ex500 or an apparatus including LSI ex500 in conjunction with switching of the driving frequency, the power-saving effect can be further increased. For example, it is conceivable that in the case where a low driving frequency is set, a voltage supplied to LSI ex500 or an apparatus including LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video encoding method or apparatus described in each of the above exemplary embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video encoding method or apparatus described in each of the above exemplary embodiments, a voltage supplied to LSI ex500 or an apparatus including LSI ex500 may be set to be high. In the case where the identification information indicates that the video data is video data based on an existing standard, such as MPEG-2, MPEG-4 AVC, or VC-1, a voltage supplied to LSI ex500 or an apparatus including LSI ex500 may be set to be low. Alternatively, in another example, in the case where the identification information indicates that the video data is video data that has been generated using the video encoding method or apparatus described in each of the above exemplary embodiments, driving of CPU ex502 is not stopped. In the case where the identification information indicates that the video data is video data based on an existing standard, such as MPEG-2, MPEG-4 AVC, or VC-1, driving of CPU ex502 may be temporarily stopped because there is a surplus of capacity relative to the processing load. When there is a surplus of capacity relative to the processing load in the case where the identification information indicates that the video data is video data that has been generated using the video encoding method or apparatus described in each of the above exemplary embodiments, driving of CPU ex502 may be temporarily stopped. In this case, a period over which CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where LSI ex500 or an apparatus including LSI ex500 is driven with a battery, the battery can be made last longer as a result of power-saving.

Sixth Exemplary Embodiment

A plurality of pieces of video data based on different standards are sometimes input to the aforementioned devices and systems, such as television ex300 and mobile phone ex114. In order to enable decoding even in the case where a plurality of pieces of video data based on different standards are input, signal processing unit ex507 of LSI ex500 needs to support the plurality of standards. However, the use of signal processing units ex507 for the respective standards undesirably makes the circuit scale of LSI ex500 larger and increases the cost.

Figure 28A:
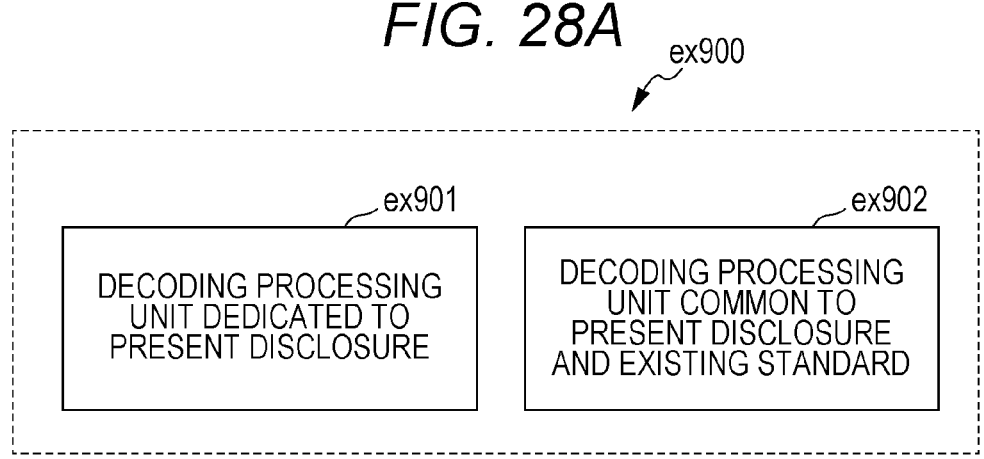
FIG. 28A is a diagram illustrating an example of a configuration that enables sharing of modules among signal processing units.

To address this issue, a decoding processing unit that executes the video decoding method described in each of the above exemplary embodiments and a decoding processing unit compliant with an existing standard, such as MPEG-2, MPEG-4 AVC, or VC-1, share some of their components. FIG. 28A illustrates an example of configuration ex900. For example, the video decoding method described in each of the above exemplary embodiments and the video decoding method compliant with the MPEG-4 AVC standard share some of contents of processing, such as entropy decoding, inverse quantization, deblocking filtering, and motion compensation. The following configuration is conceivable in which, for the shared processing contents, decoding processing unit ex902 compliant with the MPEG-4 AVC standard is used in common, and for other processing contents that are not compliant with the MPEG-4 AVC standard and are unique to an aspect of the present disclosure, dedicated decoding processing unit ex901 may be used. In particular, since an aspect of the present disclosure has a feature in hierarchical encoding, for example, dedicated decoding processing unit ex901 may be used for hierarchical encoding, and the decoding processing unit may be used in common for any of or all of other processing including entropy decoding, inverse quantization, deblocking filtering, and motion compensation. Alternatively, as for sharing of the decoding processing unit, a configuration may be used in which a decoding processing unit that executes the video decoding method described in each of the above exemplary embodiments is used for the common processing contents and a dedicated decoding processing unit is used for processing contents unique to the MPEG-4 AVC standard.

Figure 28B:
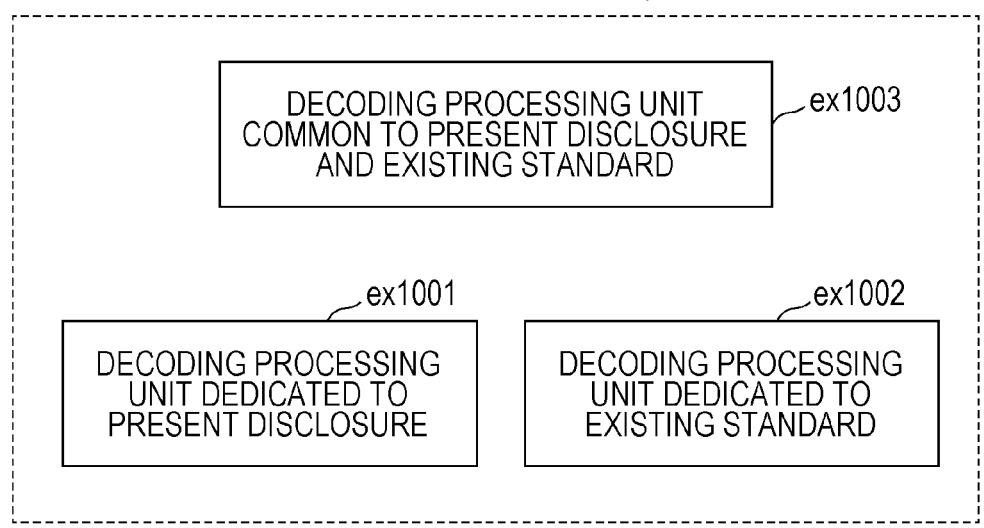
FIG. 28B is a diagram illustrating another example of a configuration that enables sharing of modules among signal processing units.

FIG. 28B illustrates another example ex1000 that implements sharing of part of processing. In this example, dedicated decoding processing unit ex1001 that handles processing contents unique to an aspect of the present disclosure, dedicated decoding processing unit ex1002 that handles processing contents unique to an existing standard, and shared decoding processing unit ex1003 that handles processing contents that are common to the video decoding method according to the aspect of the present disclosure and the video decoding method according to the existing standard are used. Here, dedicated decoding processing units ex1001 and ex1002 are not necessarily specialized for the processing contents unique to the aspect of the present disclosure and the existing standard, respectively, and may be also capable of executing other general processing. Also, the configuration according to the sixth exemplary embodiment can be implemented using LSI ex500.

By sharing a decoding processing unit for processing contents that are common to the video decoding method according to an aspect of the present disclosure and the video decoding method according to an existing standard, the circuit scale and cost of LSI ex500 can be reduced.

The present disclosure may be used in the image encoding apparatus or image encoding method.

What is claimed is:

1. An image encoding method for generating a bitstream having temporal scalability by encoding a plurality of images, comprising:
    receiving an external parameter that specifies a bit rate type of the top temporal layer as being either a constant bit rate or a variable bit rate;
    determining temporal layers having different temporal resolutions for each of a plurality of images;
    setting, in a case where the constant bit rate is acquired, (1) a first bit rate type of a top temporal layer to the constant bit rate, and (2) a second bit rate type of one or more other layers to the variable bit rate;
    setting, in a case where the variable bit rate is acquired, both the first bit rate type of the top temporal layer having the highest temporal resolution and the second bit rate type of the one or more layers having the lower temporal resolution to the variable bit rate;
    encoding each of the plurality of images, prohibiting reference to the images with the temporal layers higher than each of the temporal layers that each of the images belongs to; and
    generating the bitstream that includes temporal scalability information that indicates the temporal layers of the plurality of images, bit rate control information that indicates the first bit rate type and the second bit rate type, and the plurality of encoded images,
    wherein the bitstream is input to a buffer, and
    the input of at least one encoded image corresponding to the variable bit rate is interrupted when a free capacity of the buffer is lower than a threshold capacity.

2. The image encoding method according to claim 1, wherein in the encoding, the plurality of images are encoded such that an image decoding apparatus performs processing on the bitstream in the first bit rate type without failure, by using a hypothetical reference decoder that hypothetically models buffer management of the image decoding apparatus.

3. The image encoding method according to claim 1, wherein the temporal scalability information comprises a temporal identifier that indicates the temporal layers to which the plurality of images respectively belong, or a number of temporal resolutions that specify one or more of the temporal layers to be decoded.

4. An image encoding apparatus for generating a bitstream having temporal scalability by encoding a plurality of images, comprising:
    a processor; and
    a non-transitory memory having thereon a computer program, the computer program operable to cause the processor to execute operations, including
    receiving an external parameter that specifies a bit rate type of the top temporal layer as being either a constant bit rate or a variable bit rate;
    determining temporal layers having different temporal resolutions for each of a plurality of respective images;
    setting, in a case where the constant bit rate is acquired, (1) a first bit rate type of a top temporal layer to the constant bit rate, and (2) a second bit rate type of one or more other layers to the variable rate;
    setting, in a case where the variable bit rate is acquired, both the first bit rate type of the top temporal layer having the highest temporal resolution and the second bit rate type of the one or more layers having the lower temporal resolution to the variable bit rate;
    encoding each of the plurality of images, prohibiting reference to the images with the temporal layers higher than each of the temporal layers that each of the images belongs to; and
    generating the bitstream that includes temporal scalability information that indicates the temporal layers of the plurality of images, bit rate control information that indicates the first bit rate type and the second bit rate type, and the plurality of encoded images,
    wherein the bitstream is input to a buffer, and
    the input of at least one encoded image corresponding to the variable bit rate is interrupted when a free capacity of the buffer is lower than a threshold capacity.

5. A non-transitory computer-readable recording medium, storing a program for causing a computer to execute the image encoding method according to claim 1.

6. The image encoding method according to claim 1, wherein the generating includes storing the generated bitstream to a buffer when an empty amount of the buffer is higher than a threshold capacity, and suspending the storing of the generated bitstream to the buffer when the empty amount of the buffer is lower than or equal to the threshold capacity.

* * * * *